United States Patent
Matsuura et al.

(10) Patent No.: US 6,960,904 B2
(45) Date of Patent: Nov. 1, 2005

(54) SWITCHING POWER SUPPLY CONTROLLER AND SWITCHING POWER SUPPLY

(75) Inventors: Ken Matsuura, Chuo-ku (JP); Takeshi Uematsu, Chuo-ku (JP); Hiroshi Kawasaki, Chuo-ku (JP); Takakazu Imai, Chuo-ku (JP); Koichiro Miura, Chuo-ku (JP)

(73) Assignee: TDK Corporation, Tokyo (JP)

( * ) Notice: Subject to any disclaimer, the term of this patent is extended or adjusted under 35 U.S.C. 154(b) by 17 days.

(21) Appl. No.: 10/801,836

(22) Filed: Mar. 17, 2004

(65) Prior Publication Data

US 2004/0189264 A1 Sep. 30, 2004

(30) Foreign Application Priority Data

Mar. 28, 2003 (JP) ........................... 2003-091656
Mar. 28, 2003 (JP) ........................... 2003-091729

(51) Int. Cl.$^7$ ................................................ G05F 1/44
(52) U.S. Cl. ........................... 323/283; 323/224
(58) Field of Search ......................... 323/224, 282, 323/283, 288

(56) References Cited

U.S. PATENT DOCUMENTS 5,731,694 A * 3/1998 Wilcox et al. ............ 323/287

FOREIGN PATENT DOCUMENTS

| JP | A 7-222450 | 8/1995 |
|----|------------|--------|
| JP | A 2001-251851 | 9/2001 |
| JP | A 2002-186251 | 6/2002 |
| JP | A 2002-238254 | 8/2002 |

OTHER PUBLICATIONS

Harada et al., "The Fundamentals of Switched–Mode Converters," Corona Publishing Co., Ltd., p. 48–79, with partial translation.

* cited by examiner

Primary Examiner—Shawn Riley May
(74) Attorney, Agent, or Firm—Oliff & Berridge, PLC

(57) ABSTRACT

An adder 11 outputs a signal VS indicating a value of (Vr–Vo), and a multiplier 12 outputs a control signal GS indicating a value of G(Vr–Vo) on the basis of the signal VS. An adder 13 outputs a signal HS on the basis of the control signal GS and a signal FS outputted from an operation circuit 30, and a PWM signal generating circuit 20 generates a PWM signal KS on the basis of the signal HS and a ramp signal RS outputted from a ramp signal circuit 15, and outputs this signal KS to a switching power supply. A counter 14 counts an on time of the PWM signal KS and retains a count value at a time of receiving a sample signal SMP. The operation circuit 30 has a high-pass filter 31 and an integrator 32, performs an operation based on a signal DS indicating the count value outputted from the counter 14, and outputs the signal FS after the operation.

53 Claims, 28 Drawing Sheets

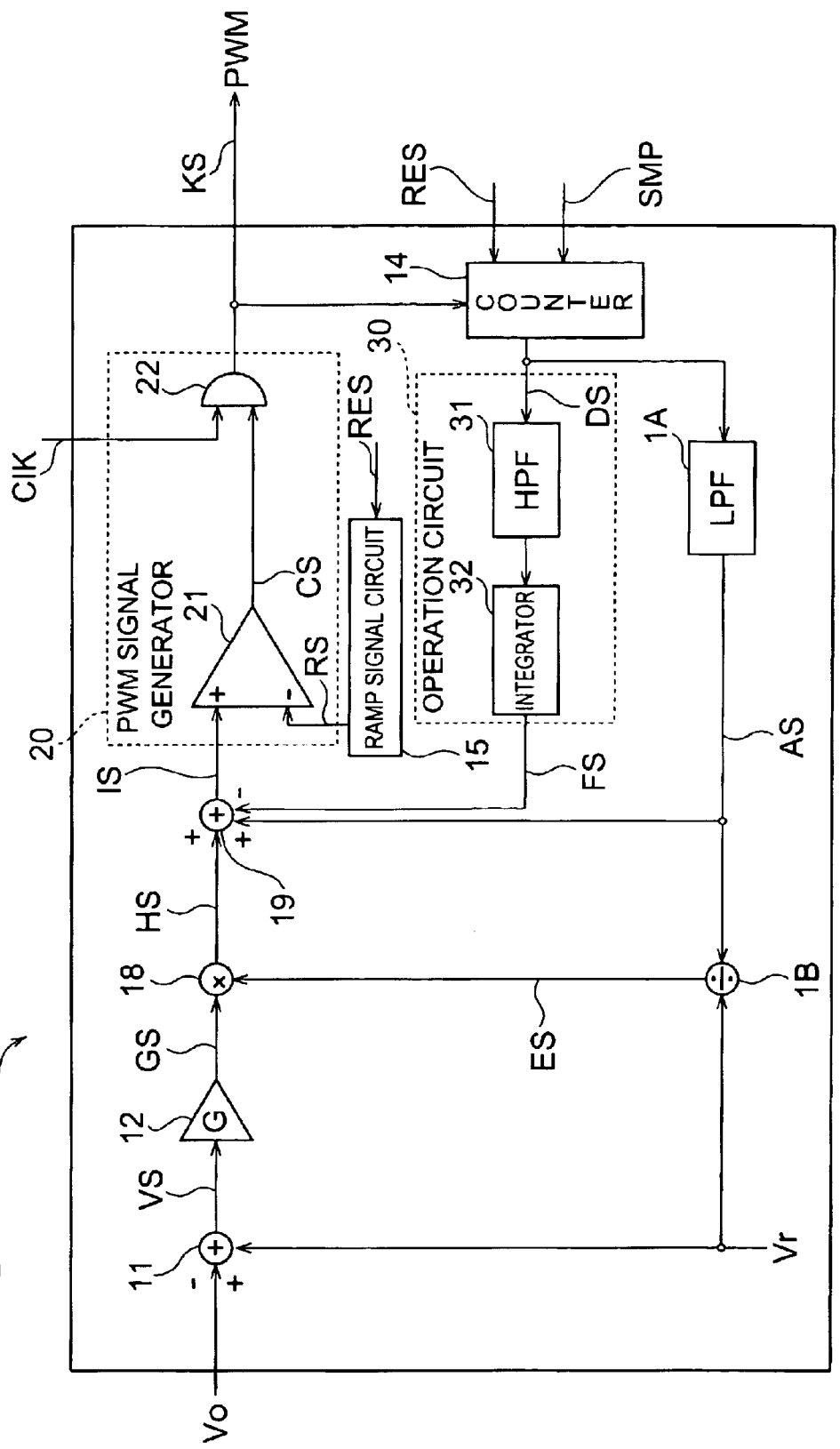

SWITCHING POWER SUPPLY CONTROLLER AND SWITCHING POWER SUPPLY

BACKGROUND OF THE INVENTION

1. Field of the Invention

The present invention relates to a switching power supply controller and a switching power supply.

2. Related Background Art

A switching power supply has such properties as small size, light weight, and high efficiency and is commonly used as a power supply for microcomputers as incorporated in various devices, personal computers, and so on. These personal computers and others are progressively advancing toward lower voltage and higher processing speed, while increasing the consumption current more and more. In the switching power supply, therefore, the load current suddenly increases or decreases according to the processing load in the personal computers and others. The switching power supply possesses the property of capability of readily adapting to a wide input voltage range and is also utilized as a power supply applicable in several countries in the world or as a power supply with a wide specification setting of input voltage. The switching power supply needs to insure the stable output voltage against change of the load current and input voltage as described above. Furthermore, even if the output voltage is in a transient response state to a sudden change of the load current or the input voltage, the switching power supply must recover quickly into a stable state.

For this reason, the switching power supply is equipped with a controller such as a controller IC [Integrated Circuit] or the like of a digital control system, and this controller quickly turns switching elements such as FETs [Field Effect Transistors] or the like on and off (Nonpatent Document 1 ["The Fundamentals of Switched-Mode Converters", coauthored by Kousuke Harada, Tamotsu Ninomiya, and Bunken Ko and published by CORONA PUBLISHING CO., LTD., p48–p79]). The controller adopts the feedback control based on voltage mode control or current mode control to generate a PWM [Pulse Width Modulation] signal for turning the switching elements on and off on the basis of the output voltage or the like of the switching power supply.

SUMMARY OF THE INVENTION

In the conventional switching power supplies, however, an LC filter, the controller, etc. cause a phase lag and this phase lag becomes larger with increase of frequency. When this phase lag reaches 180°, the output voltage of the switching power supply comes to oscillate. Accordingly, there is a need for adopting some means for such phase compensation as to prevent the phase lag from reaching 180°.

In order to solve the above-stated problem, an object of the present invention is to provide a switching power supply controller and a switching power supply capable of implementing the phase compensation by achieving a phase lead.

A switching power supply controller according to the present invention is a switching power supply controller for outputting a drive signal for controlling a switching element of a switching power supply, to the switching power supply, the switching power supply controller comprising: a high-pass filter for cutting off a low-frequency component included in a signal corresponding to a duty ratio of the drive signal; integrating means for integrating a signal resulting from the cutoff of the low-frequency component by the high-pass filter; difference calculating means for calculating a difference between a signal indicating a difference between an output voltage of the switching power supply and a target voltage for the output voltage, and a signal resulting from the integration by the integrating means; and drive signal generating means for generating the drive signal, based on a signal resulting from the calculation by the difference calculating means, and a ramp signal.

According to this invention, the high-pass filter and the integrating means in a feedback loop cut off the low-frequency component from the signal corresponding to the duty ratio of the drive signal and integrate the signal resulting from the cutoff, and the drive signal is generated based on the signal after the integration; therefore, a transfer function of the switching power supply controller has a phase lead and also secures the DC gain.

Another switching power supply controller according to the present invention is a switching power supply controller for outputting a drive signal for controlling a switching element of a switching power supply, to the switching power supply, the switching power supply controller comprising: a high-pass filter for cutting off a low-frequency component included in a signal corresponding to a duty ratio of the drive signal; integrating means for integrating a signal resulting from the cutoff of the low-frequency component by the high-pass filter; averaging means for obtaining an average of the duty ratio on the basis of the signal corresponding to the duty ratio of the drive signal; gain adjustment value calculating means for calculating a gain adjustment value on the basis of a signal corresponding to the average duty ratio obtained by the averaging means, and a signal indicating a target voltage for an output voltage in the switching power supply; multiplying means for multiplying a signal indicating a difference between the output voltage of the switching power supply and the target voltage, by the gain adjustment value calculated by the gain adjustment value calculating means; adding means for adding up a signal resulting from the multiplication by the multiplying means, the signal corresponding to the average duty ratio obtained by the averaging means, and a signal resulting from the integration by the integrating means; and drive signal generating means for generating the drive signal on the basis of a signal resulting from the addition by the adding means, and a ramp signal.

According to this invention, the high-pass filter and the integrating means in a feedback loop cut off the low-frequency component from the signal corresponding to the duty ratio of the drive signal and integrate the signal resulting from the cutoff, and the drive signal is generated based on the signal after the integration; therefore, a transfer function of the switching power supply controller has a phase lead and also secures the DC gain. The adding means adds the signal corresponding to the average duty ratio obtained by the averaging means, to the signal indicating the difference between the output voltage of the switching power supply and the target voltage, whereby it is feasible to stabilize the output voltage of the switching power supply. Furthermore, the multiplying means multiplies the signal indicating the difference between the output voltage of the switching power supply and the target voltage, by the gain adjustment value calculated by the gain adjustment value calculating means, whereby it is feasible to stabilize the gain of the entire switching power supply.

In the switching power supply controller of the present invention, preferably, the high-pass filter is a second-order high-pass filter. This configuration permits the switching power supply controller to cut off the low-frequency component more securely.

Another switching power supply controller according to the present invention is a switching power supply controller for outputting a drive signal for controlling a switching element of a switching power supply, to the switching power supply, the switching power supply controller comprising: operation means for performing an operation on a signal corresponding to a duty ratio of the drive signal, the operation means integrally having a high-pass filter function and an integrating function; difference calculating means for calculating a difference between a signal indicating a difference between an output voltage of the switching power supply and a target voltage for the output voltage, and a signal resulting from the operation by the operation means; and drive signal generating means for generating the drive signal on the basis of a signal resulting from the calculation by the difference calculating means, and a ramp signal.

According to this invention, the operation means in a feedback loop cuts off the low-frequency component and outputs the signal resulting from the integration, based on the signal corresponding to the duty ratio of the drive signal, and the drive signal is generated based on the signal outputted by the operation means; therefore, a transfer function of the switching power supply controller has a phase lead and also secures the DC gain.

Still another switching power supply controller according to the present invention is a switching power supply controller for outputting a drive signal for controlling a switching element of a switching power supply, to the switching power supply, the switching power supply controller comprising: operation means for performing an operation on a signal corresponding to a duty ratio of the drive signal, the operation means integrally having a high-pass filter function and an integrating function; averaging means for obtaining an average of the duty ratio on the basis of the signal corresponding to the duty ratio of the drive signal; gain adjustment value calculating means for calculating a gain adjustment value on the basis of a signal corresponding to the average duty ratio obtained by the averaging means, and a signal indicating a target voltage for an output voltage in the switching power supply; multiplying means for multiplying a signal indicating a difference between the output voltage of the switching power supply and the target voltage, by the gain adjustment value calculated by the gain adjustment value calculating means; adding means for adding up a signal resulting from the multiplication by the multiplying means, the signal corresponding to the average duty ratio obtained by the averaging means, and a signal resulting from the operation by the operation means; and drive signal generating means for generating the drive signal on the basis of a signal resulting from the addition by the adding means, and a ramp signal.

According to this invention, the operation means in a feedback loop cuts off the low-frequency component and outputs the signal resulting from the integration, based on the signal corresponding to the duty ratio of the drive signal, and the drive signal is generated based on the signal outputted by the operation means; therefore, a transfer function of the switching power supply controller has a phase lead and also secures the DC gain. The adding means adds the signal corresponding to the average duty ratio obtained by the averaging means, to the signal indicating the difference between the output voltage of the switching power supply and the target voltage, whereby it is feasible to stabilize the output voltage of the switching power supply. Furthermore, the multiplying means multiplies the signal indicating the difference between the output voltage of the switching power supply and the target voltage, by the gain adjustment value calculated by the gain adjustment value calculating means, whereby it is feasible to stabilize the gain of the entire switching power supply.

In the switching power supply controller of the present invention, preferably, a transfer function H(Z) of the operation means is $1/(1-b*Z^{-1})$ or $(1-Z^{-1})/[(1-b1*Z^{-1})(1-b2*Z^{-1})]$ (b, b1, and b2 are coefficients).

Still another switching power supply controller according to the present invention is a switching power supply controller for outputting a drive signal for controlling a switching element of a switching power supply, to the switching power supply, the switching power supply controller comprising: a first high-pass filter for cutting off a low-frequency component included in a signal corresponding to a duty ratio of the drive signal; integrating means for integrating a signal resulting from the cutoff of the low-frequency component by the first high-pass filter; a second high-pass filter for cutting off a low-frequency component included in a signal resulting from the integration by the integrating means; difference calculating means for calculating a difference between a signal indicating a difference between an output voltage of the switching power supply and a target voltage for the output voltage, and a signal resulting from the cutoff of the low-frequency component by the second high-pass filter; and drive signal generating means for generating the drive signal on the basis of a signal resulting from the calculation by the difference calculating means, and a ramp signal.

According to this invention, the first high-pass filter, the integrating means, and the second high-pass filter in a feedback loop cut off the low-frequency component from the signal corresponding to the duty ratio of the drive signal, integrate the signal resulting from the cutoff, and cut off the low-frequency component from the signal resulting from the integration, and the drive signal is generated based on the signal after this cutoff; therefore, a transfer function of the switching power supply controller has a phase lead and also secures the DC gain.

Still another switching power supply controller according to the present invention is a switching power supply controller for outputting a drive signal for controlling a switching element of a switching power supply, to the switching power supply, the switching power supply controller comprising: a first high-pass filter for cutting off a low-frequency component included in a signal corresponding to a duty ratio of the drive signal; integrating means for integrating a signal resulting from the cutoff of the low-frequency component by the first high-pass filter; a second high-pass filter for cutting off a low-frequency component included in a signal resulting from the integration by the integrating means; averaging means for obtaining an average of the duty ratio on the basis of the signal corresponding to the duty ratio of the drive signal; gain adjustment value calculating means for calculating a gain adjustment value on the basis of a signal corresponding to the average duty ratio obtained by the averaging means, and a signal indicating a target voltage for an output voltage in the switching power supply; multiplying means for multiplying a signal indicating a difference between the output voltage of the switching power supply and the target voltage, by the gain adjustment value calculated by the gain adjustment value calculating means; adding means for adding up a signal resulting from the multiplication by the multiplying means, the signal corresponding to the average duty ratio obtained by the averaging means, and a signal resulting from the cutoff of the low-frequency component by the second high-pass filter; and drive signal generating means for generating the drive signal on the basis of a signal resulting from the addition by the adding means, and a ramp signal.

According to this invention, the first high-pass filter, the integrating means, and the second high-pass filter in a feedback loop cut off the low-frequency component from the signal corresponding to the duty ratio of the drive signal, integrate the signal resulting from the cutoff, and cut off the low-frequency component from the signal resulting from the integration, and the drive signal is generated based on the signal after this cutoff; therefore, a transfer function of the switching power supply controller has a phase lead and also secures the DC gain. The adding means adds the signal corresponding to the average duty ratio obtained by the averaging means, to the signal indicating the difference between the output voltage of the switching power supply and the target voltage, whereby it is feasible to stabilize the output voltage of the switching power supply. Furthermore, the multiplying means multiplies the signal indicating the difference between the output voltage of the switching power supply and the target voltage, by the gain adjustment value calculated by the gain adjustment value calculating means, whereby it is feasible to stabilize the gain of the entire switching power supply.

In the switching power supply controller of the present invention, preferably, the first high-pass filter and the second high-pass filter are first-order high-pass filters. This permits the controller to be constructed in a more simplified circuit configuration.

The switching power supply controller of the present invention may be constructed in a configuration further comprising counter means for counting an on time of the drive signal generated by the drive signal generating means, every switching period, wherein the signal corresponding to the duty ratio of the drive signal is a signal indicating a value resulting from the counting by the counter means. The controller may also be constructed in a configuration further comprising delay means for retaining the signal resulting from the calculation by the difference calculating means, for a predetermined time and then outputting the signal, wherein the signal corresponding to the duty ratio of the drive signal is the signal outputted by the delay means. The controller may also be constructed in a configuration further comprising delay means for retaining the signal resulting from the addition by the adding means, for a predetermined time and then outputting the signal, wherein the signal corresponding to the duty ratio of the drive signal is the signal outputted by the delay means.

The switching power supply controller of the present invention may be constructed in a configuration wherein the drive signal generating means switches a level of the drive signal from a low level to a high level at a predetermined interval and switches the level of the drive signal from the high level to the low level on the basis of a result of a comparison between the signal resulting from the calculation by the difference calculating means, and the ramp signal, and wherein, based on the signal resulting from the calculation by the difference calculating means at a time of switching when the output level of the drive signal is switched from the high level to the low level, the delay means detects a value corresponding to the signal resulting from the calculation and outputs the detected value until a next time of switching. The controller may also be constructed in a configuration wherein the drive signal generating means switches a level of the drive signal from a high level to a low level at a predetermined interval and switches the level of the drive signal from the low level to the high level on the basis of a result of a comparison between the signal resulting from the calculation by the difference calculating means, and the ramp signal, and wherein, based on the signal resulting from the calculation by the difference calculating means at a time of switching when the output level of the drive signal is switched from the low level to the high level, the delay means detects a value corresponding to the signal resulting from the calculation and outputs the detected value until a next time of switching.

In the switching power supply controller of the present invention, preferably, the drive signal generating means switches an output level of the drive signal to a high level or to a low level on the basis of a result of a comparison between the signal resulting from the calculation by the difference calculating means, and the ramp signal. This permits the controller to control a period in which the level of the drive signal is the high level, based on the result of the comparison between the signal resulting from the calculation by the difference calculating means, and the ramp signal.

The switching power supply controller of the present invention may be constructed in a configuration wherein the drive signal generating means switches a level of the drive signal from a low level to a high level at a predetermined interval and switches the level of the drive signal from the high level to the low level on the basis of a result of a comparison between the signal resulting from the addition by the adding means, and the ramp signal, and wherein, based on the signal resulting from the addition by the adding means at a time of switching when the output level of the drive signal is switched from the high level to the low level, the delay means detects a value corresponding to the signal resulting from the addition and outputs the detected value until a next time of switching. The controller may also be constructed in a configuration wherein the drive signal generating means switches a level of the drive signal from a high level to a low level at a predetermined interval and switches the level of the drive signal from the low level to the high level on the basis of a result of a comparison between the signal resulting from the addition by the adding means, and the ramp signal, and wherein, based on the signal resulting from the addition by the adding means at a time of switching when the output level of the drive signal is switched from the low level to the high level, the delay means detects a value corresponding to the signal resulting from the addition and outputs the detected value before a next time of switching.

In the switching power supply controller of the present invention, preferably, the drive signal generating means switches an output level of the drive signal to a high level or to a low level on the basis of a result of a comparison between the signal resulting from the addition by the adding means, and the ramp signal. This permits the controller to control a period in which the level of the drive signal is the high level, based on the result of the comparison between the signal resulting from the addition by the adding means, and the ramp signal.

In the switching power supply controller of the present invention, preferably, the averaging means is a low-pass filter. This permits the averaging means to be constructed in a simple configuration utilizing the averaging function of the low-pass filter.

BRIEF DESCRIPTION OF THE DRAWINGS

FIG. 22 is a circuit diagram showing a circuit configuration of a controller IC in the third embodiment.

DESCRIPTION OF THE PREFERRED EMBODIMENTS

Each of embodiments of the switching power supply controller according to the present invention will be described below on the basis of the drawings. The same elements will be denoted by the same reference symbols throughout the drawings, without redundant description.

First Embodiment

Figure 1:
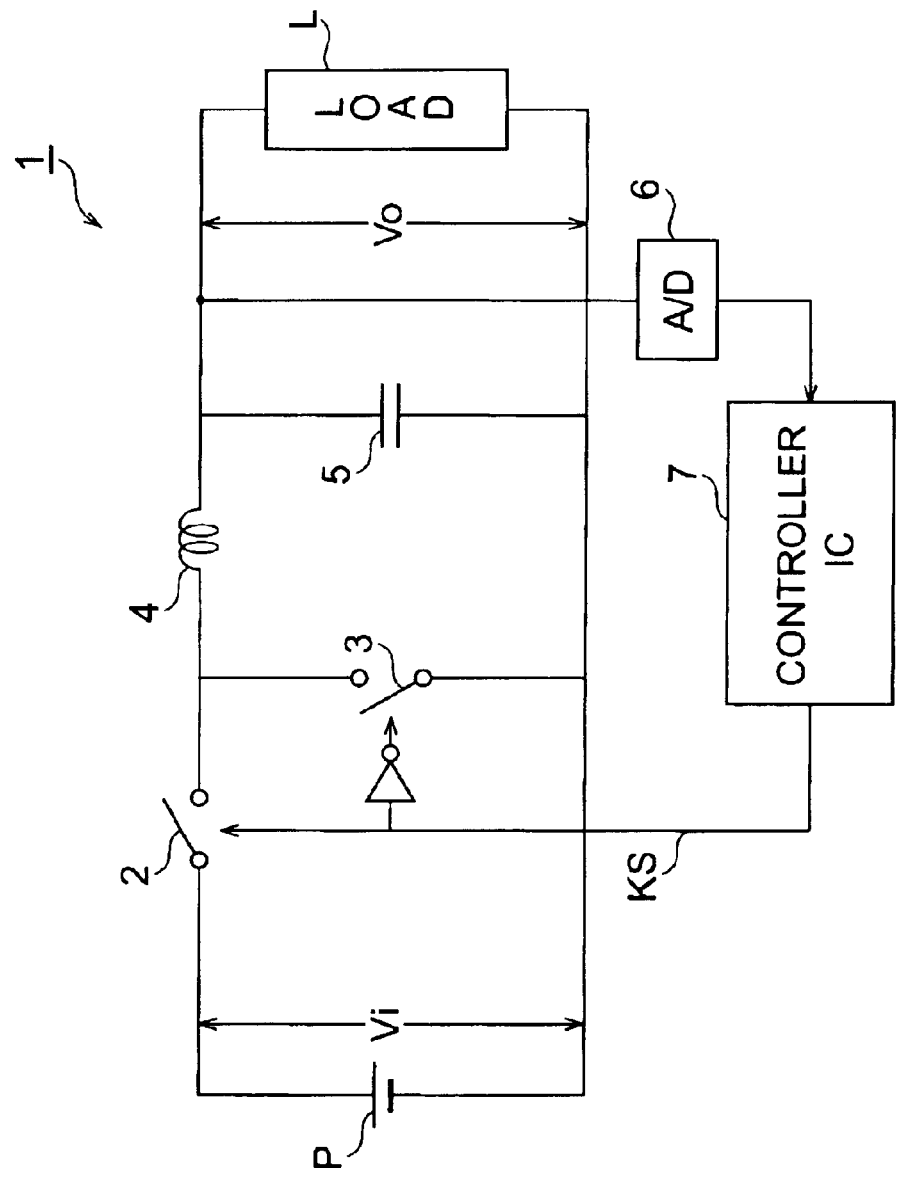
FIG. 1 is a circuit diagram showing a circuit configuration of a switching power supply in each embodiment of the present invention.

First, the first embodiment of the present invention will be described. FIG. 1 is a diagram to illustrate an electric circuit configuration of a switching power supply 1 in the first embodiment. The switching power supply 1 in the present embodiment is a DC-DC converter, and, as shown in FIG. 1, has switching elements 2, 3, an inductor 4, a capacitor 5, an A/D converter 6, and a controller IC 7 (switching power supply controller).

A power source P applies an input voltage Vi to the switching power supply 1. The switching elements 2, 3 are devices having a switching function and are, for example, transistors such as field effect transistors (FETs) or the like. A PWM signal (drive signal) KS outputted from the controller IC 7 is fed to gates of the switching elements 2, 3. The switching element 2 and the switching element 3 are alternately turned on and off based on levels of the PWM signal KS. Specifically, where the level of the PWM signal KS is high, the switching element 2 is in an on state and the switching element 3 in an off state. On the other hand, where the level of the PWM signal KS is low, the switching element 2 is in the off state and the switching element 3 in the on state.

The inductor 4 and capacitor 5 function as an LC filter (smoothing circuit) for stabilizing an output voltage Vo. The A/D converter 6 converts an analog signal indicating the output voltage Vo, into a digital signal.

A load L is a recipient of the output voltage Vo outputted from the switching power supply 1 and is, for example, a CPU (Central Processing Unit) or an MPU (Micro Processing Unit) used in PC terminals or the like. Such CPU and MPU have a power-saving mode and have a feature of suddenly increasing load variation during a transition from the power-saving mode to the normal mode.

Figure 2:
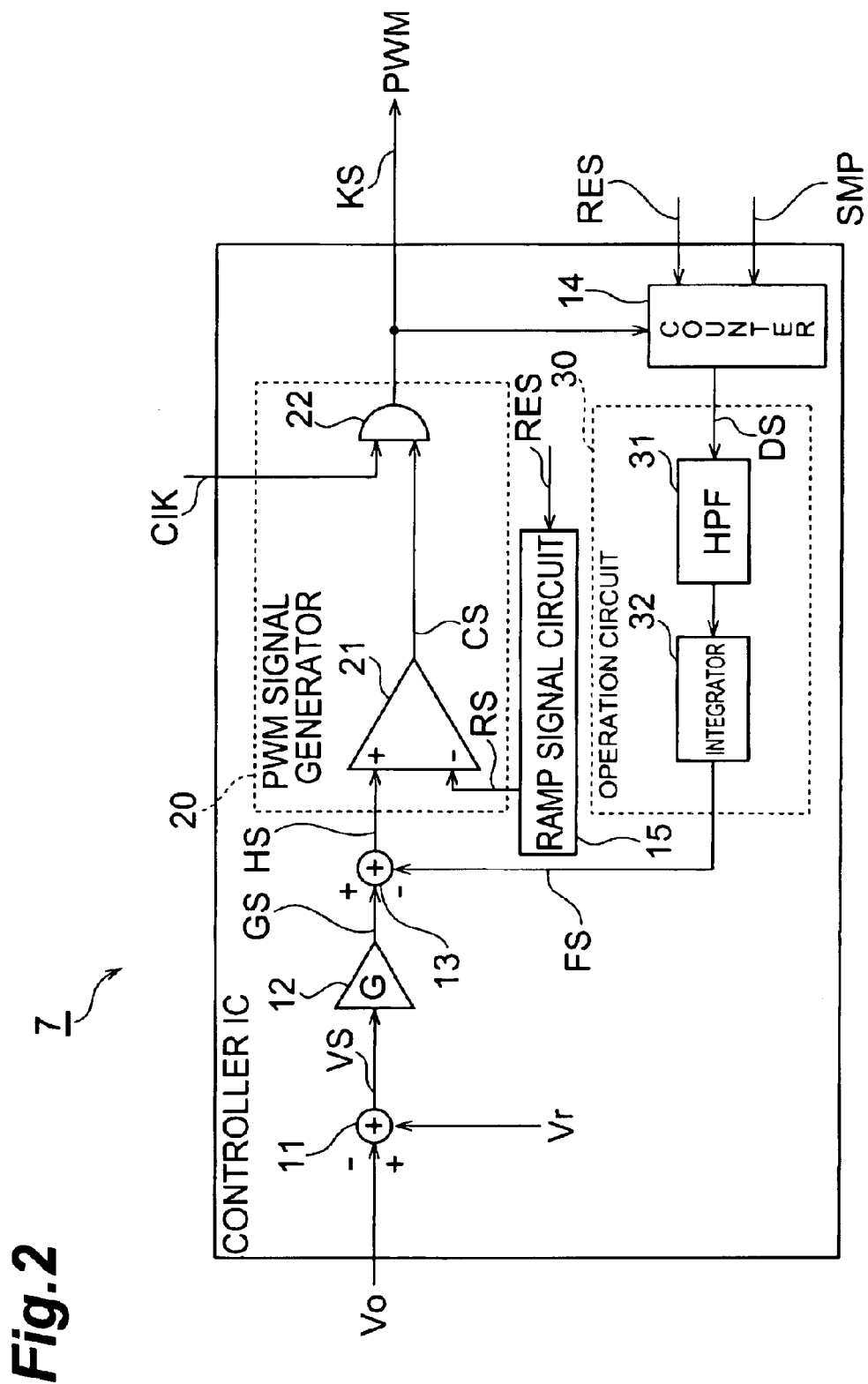
FIG. 2 is a circuit diagram showing a circuit configuration of a controller IC in the first embodiment.

The controller IC 7 generates the PWM signal KS on the basis of a target voltage Vr as a target value for the output voltage Vo supplied to the load L, and the output voltage Vo. The circuit configuration of the controller IC 7 will be described below with reference to FIG. 2. As shown in FIG. 2, the controller IC 7 has an adder 11, a multiplier 12, an adder (difference calculating means) 13, a PWM signal generating circuit (drive signal generating means) 20, a counter 14, an operation circuit 30, and a ramp signal circuit 15.

The adder 11 outputs a signal VS indicating a value of (Vr−Vo), based on a digital signal indicating the output voltage Vo and a digital signal indicating the target voltage Vr. Namely, the adder 11 adds the output voltage Vo (negative) to the target voltage Vr (positive) to calculate a difference voltage value (Vr−Vo) between the output voltage Vo and the target voltage Vr.

The multiplier 12 outputs a control signal GS indicating a value of G(Vr−Vo), based on the signal VS indicating the difference voltage value (Vr−Vo). Namely, the multiplier 12 multiplies the difference voltage value (Vr−Vo) between the output voltage Vo and the target voltage Vr by G being a gain of the multiplier 12 to calculate G(Vr−Vo) which is a value resulting from multiplication of the difference voltage value (Vr−Vo) by G.

The adder 13 outputs a signal HS on the basis of the control signal GS indicating the value of G(Vr−Vo) outputted from the multiplier 12 and a signal FS outputted from the operation circuit 30. Namely, the adder 13 adds the control signal GS (positive) indicating the value of G(Vr−Vo) to the signal FS (negative) outputted from the operation circuit 30, to calculate the signal HS indicating the difference between the control signal GS and the signal FS.

The PWM signal generating circuit 20 generates the PWM signal KS on the basis of the signal HS outputted from the adder 13 and a ramp signal RS outputted from the ramp signal circuit 15. The PWM signal generating circuit 20 has a comparator 21 and an AND circuit 22.

The comparator 21 performs a comparison based on the signal HS outputted from the adder 13 and the ramp signal RS outputted from the ramp signal circuit 15 and outputs a signal CS indicating the result of the comparison between these signals. Namely, the comparator 21 compares the value of the signal HS with the value of the ramp signal RS, and outputs the signal CS at a high level if the value of the signal HS is larger than the value of the ramp signal RS but outputs the signal CS at a low level if the value of the signal HS is not more than the value of the ramp signal RS. Namely, the signal CS turns to the high level only if the value of the ramp signal RS is smaller than the value of the signal HS.

The AND circuit 22 outputs the PWM signal KS being the drive signal for the switching elements 2, 3, based on a signal clk generated based on pulses resulting from frequency division of a master clock MC, and based on the signal CS outputted from the comparator 21. Namely, the AND circuit 22 calculates a logical product of the signal clk and the signal CS and outputs the result of the calculation as the PWM signal KS. The AND circuit 22 in the present embodiment has a function of limiting the upper limit of the pulse width of the PWM signal KS.

The counter 14 counts the count value up when the output level of the PWM signal KS is the high level. When receiving a reset signal RES, the counter 14 resets the count value. When receiving a sample signal SMP, the counter 14 holds the count value at that time and outputs a signal DS indicating the count value thus held. Namely, the counter 14 counts an on time of the PWM signal KS during a period between reception of a reset signal RES and reception of a sample signal SMP and holds the count value at the time of reception of the sample signal SMP.

The operation circuit 30 performs an operation based on the signal DS indicating the count value outputted from the counter 14 and outputs the signal FS after the operation. The operation circuit 30 herein, as shown in FIG. 2, has a high-pass filter (HPF) 31 and an integrator 32.

The high-pass filter 31 is a second-order high-pass filter and is a filter circuit for cutting off a low-frequency component included in the signal DS outputted by the counter 14. Since the operation circuit is provided with the high-pass filter 31, the low-frequency component in the signal DS is cut off thereby, so that the signal without the DC component can be fed into the integrator 32.

The integrator 32 is a circuit for integrating a signal after the cutoff of the low-frequency component by the high-pass filter 31. Since the operation circuit is provided with the integrator 32 of this type, it can integrate the signal resulting from the cutoff of the low-frequency component from the signal DS corresponding to an on time of the PWM signal KS.

Figure 3:
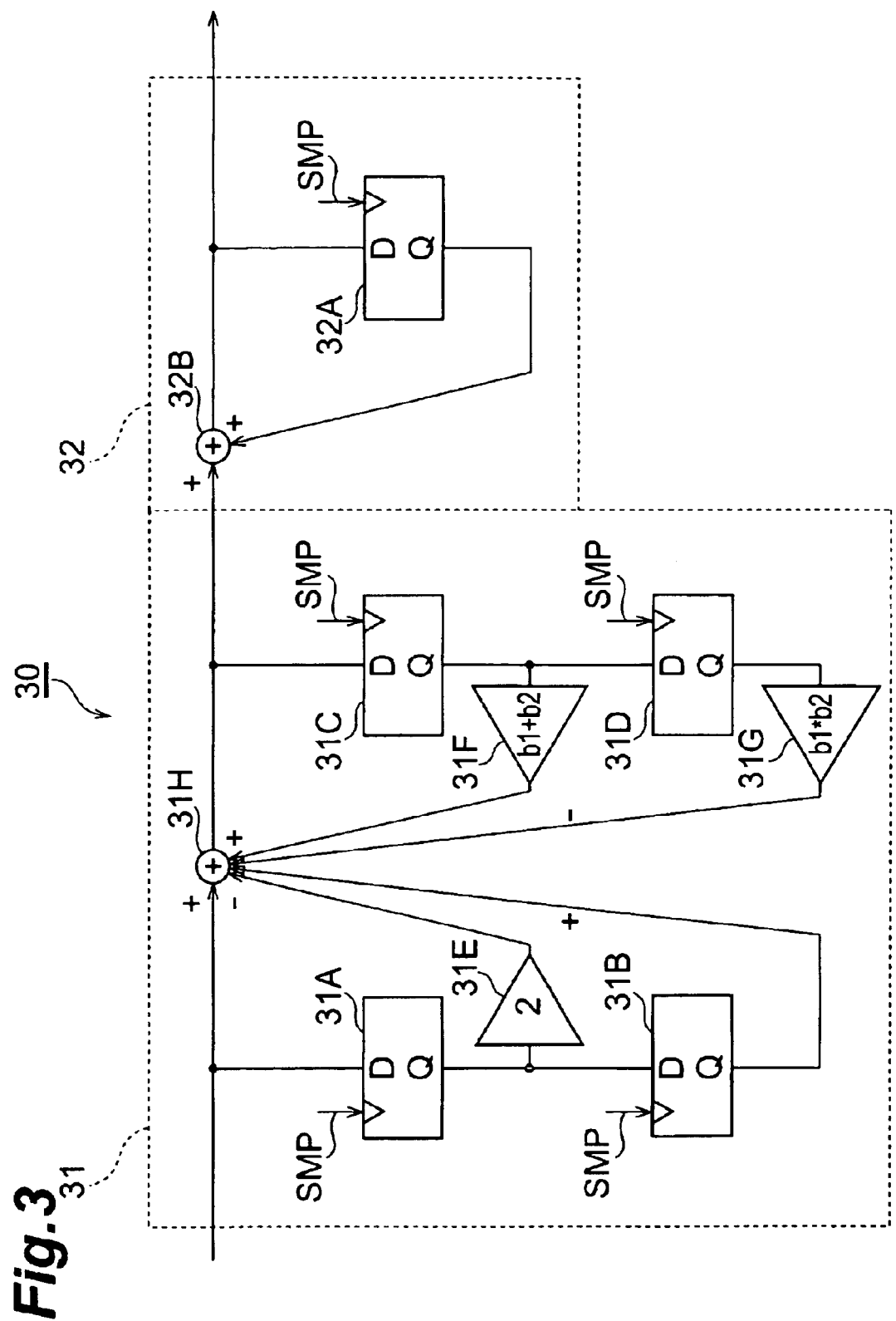
FIG. 3 is a circuit diagram showing a detailed circuit configuration of an operation circuit in each embodiment.

A detailed circuit configuration of the operation circuit 30 will be described below with reference to FIG. 3. As shown in FIG. 3, the operation circuit 30 has a second-order high-pass filter 31 and an integrator 32. The second-order high-pass filter 31 has D flip-flops 31A-31D being delay devices, a multiplier 31E with a multiplication coefficient of "2", a multiplier 31F with a multiplication coefficient of "b1+b2", a multiplier 31G with a multiplication coefficient of "b1*b2", and an adder 31H. This circuit configuration is implemented based on a transfer function H(Z) of the high-pass filter 31 represented by Eq. 1 below.

$$H(Z)=[(1-Z^{-1})/(1-b1*Z^{-1})]*[(1-Z^{-1})/(1-b2*Z^{-1})] \quad \text{(Eq. 1)}$$

(b1 and b2 are coefficients)

The integrator 32 of the operation circuit 30 has a D flip-flop 32A being a delay device, and an adder 32B. This circuit configuration is implemented based on a transfer function H(Z) of the integrator 32 represented by Eq. 2 below.

$$H(Z)=1/(1-Z^{-1}) \quad \text{(Eq. 2)}$$

Figure 4:
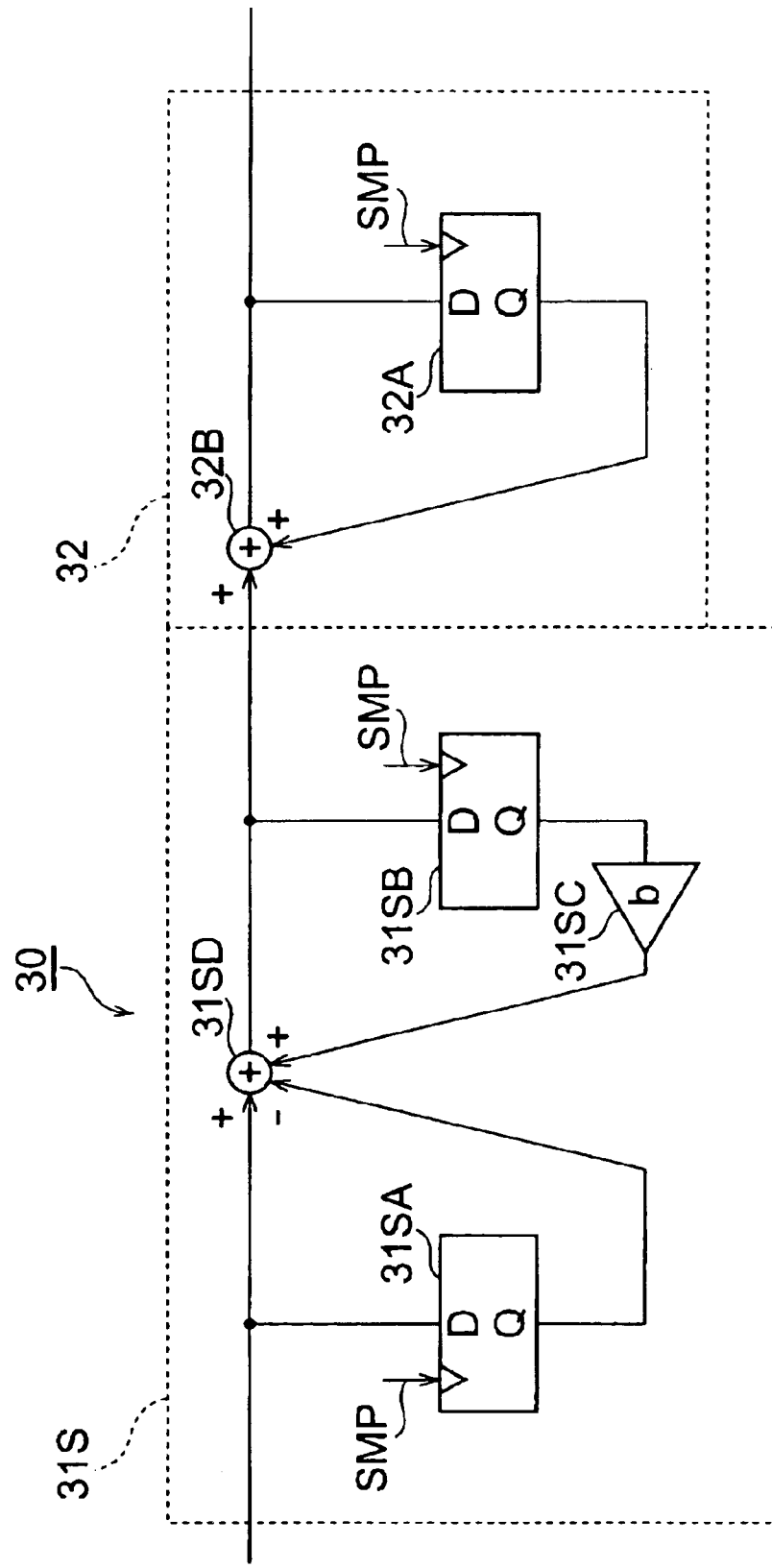
FIG. 4 is a circuit diagram showing a detailed circuit configuration of another operation circuit in each embodiment.

The present embodiment describes a case where the high-pass filter 31 is a second-order high-pass filter, but the high-pass filter 31 does not have to be limited to the second-order filter. Namely, the high-pass filter 31 to be applied can be any high-pass filter that is a first or higher-order high-pass filter. FIG. 4 shows a detailed circuit diagram in a case where the operation circuit 30 is composed of a first-order high-pass filter 31S and an integrator 32, and it will be described below. As shown in FIG. 4, the first-order high-pass filter 31S has D flip-flops 31SA, 31SB being delay devices, a multiplier 31SC with a multiplication coefficient of "b", and an adder 31SD. This circuit configuration is implemented based on a transfer function H(Z) of the high-pass filter 31S represented by Eq. 3 below.

$$H(Z)=(1-Z^{-1})/(1-b*Z^{-1}) \quad \text{(Eq. 3)}$$

(b is a coefficient)

Since the operation circuit 30 is provided with the integrator 32 in the present embodiment as described above, the transfer function of the controller IC 7 has a phase lead as detailed later, and it is thus able to achieve the phase compensation for the entire switching power supply 1. Since the signal fed into the integrator 32 is the signal after the cutoff of the low-frequency component by the high-pass filter 31, it is feasible to prevent the value resulting from the integration by this integrator 32, from becoming saturated (or from infinitely diverging).

Figure 5:
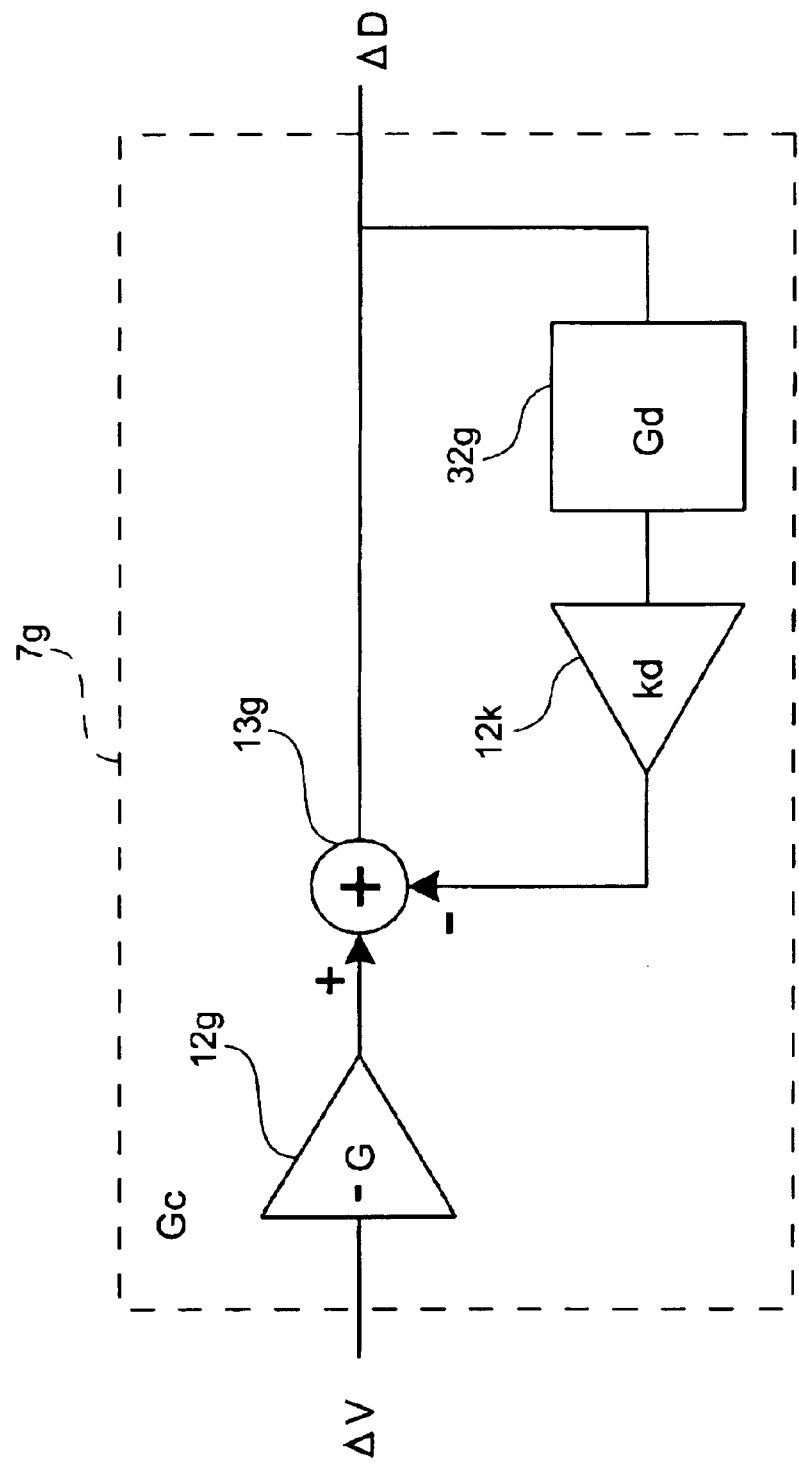
FIG. 5 is a diagram showing an example of a control circuit for implementing a feedback through a feedback loop.

The principle of achievement of the phase lead in the controller IC 7 will be described below with reference to FIG. 5. FIG. 5 shows an example of a control circuit in a configuration similar to the controller IC 7 in the present embodiment, wherein the integral of the duty ratio of the drive signal to be outputted to the switching power supply is fed back through a feedback loop. The duty ratio herein is a rate of an on time in one switching period of the drive signal. The control circuit 7g shown in FIG. 5 has a multiplier 12g with a transfer function of "−G", an integrator 32g with a transfer function of "Gd", a multiplier 12k with a transfer function of "kd", and an adder 13g. The transfer function Gc(Z) of this control circuit 7g is determined as a ratio of a duty ratio change ΔD outputted from the control circuit, to an output voltage change ΔV of the switching power supply fed into the control circuit 7g, and is represented by Eq. 4 below.

$$Gc(Z)=\Delta D/\Delta V=(-G)/(1+kd*Gd) \tag{Eq. 4}$$

The transfer function Gd(Z) of the integrator 32g is represented by Eq. 5 below.

$$Gd(Z)=1/(1-Z^{-1}) \tag{Eq. 5}$$

By substituting Eq. 5 into Eq. 4, the transfer function Gc(Z) of the control circuit 7g is determined as represented by Eq. 6 below.

$$Gc(Z)=[(-G)/(1+kd)]*\{(1-Z^{-1})/[1-(1/1+kd)*Z^{-1})]\} \tag{Eq. 6}$$

Since the transfer function H(Z) of a first-order high-pass filter is represented by $(1-Z^{-1})/(1-b*Z^{-1})$; (b is a coefficient), it is seen that the transfer function Gc(Z) of Eq. 6 is expressed by the transfer function of the first-order high-pass filter. Namely, the transfer function Gc(Z) of the control circuit 7g having the integrator 32g in the feedback loop shown in FIG. 5 is expressed by the transfer function of the first-order high-pass filter.

Incidentally, the transfer function of the first-order high-pass filter generally has a phase lead of 90° as described later. Accordingly, the transfer function Gc of the control circuit 7g having the integrator 32g in the feedback loop shown in FIG. 5 also has the phase lead of 90°.

Described below is why the transfer function of the first-order high-pass filter has the phase lead of 90°. First, the transfer function Gc(Z) of the control circuit 7g represented by Eq. 6 is transformed into an analog transfer function Gc(s) by inverse bilinear transformation. In general, the inverse bilinear transformation is carried out using Eq. 7 below.

$$Z^{-1}=[1-(s/2*fs)]/[1+(s/2*fs)] \tag{Eq. 7}$$

(fs: Sampling Frequency)

When the transfer function Gc(Z) of the control circuit 7g represented by Eq. 6 is subjected to inverse bilinear transformation using Eq. 7, the analog transfer function Gc(s) is determined as indicated by Eq. 8 below.

$$Gc(s)=[(-2G)/(2+kd)]*[s/(s+2\pi*fc)] \tag{Eq. 8}$$

(fc: Cutoff Frequency of the First-order High-pass Filter), wherein fc=(fs/π)*[kd/(2+kd)].

Where a predetermined frequency is f, the relation of s=j*2π*f (j: imaginary unit) holds. Where this predetermined frequency f is negligibly smaller than the cutoff frequency fc of the first-order high-pass filter, Eq. 8 above can be approximately represented by Eq. 9 below.

$$Gc=[(-2G)/(2+kd)]*[j*2\pi*f/(2\pi*fc)] \tag{Eq. 9}$$

Since the transfer function Gc of the control circuit 7g represented by Eq. 9 is expressed by a pure imaginary number proportional to j being the imaginary unit as described above, the transfer function Gc of the control circuit 7g has the phase lead of 90°. Namely, the transfer function Gc of the control circuit 7g having the integrator 32g in the feedback loop has the phase lead of 90°.

Figure 6:
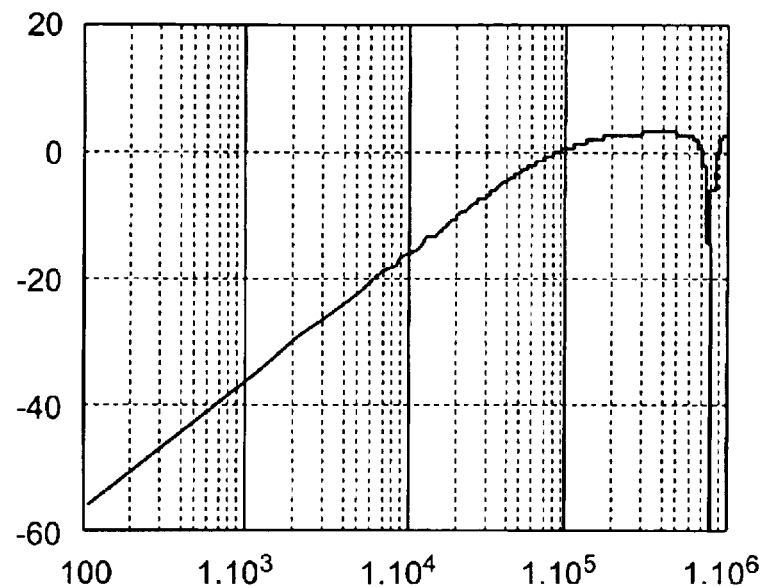
FIG. 6 is a graph showing the gain characteristic of the transfer function in the control circuit.
Figure 7:
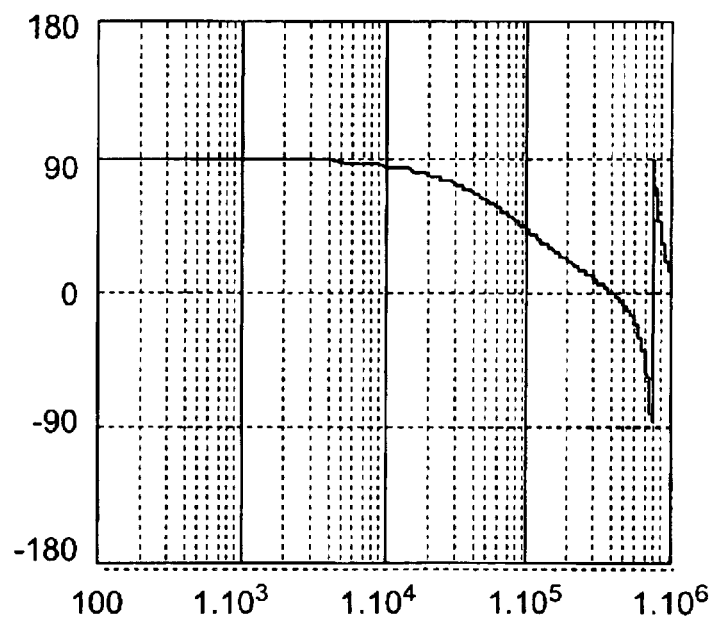
FIG. 7 is a graph showing the phase characteristic of the transfer function in the control circuit.

This can also be described from the gain characteristic graph and the phase characteristic graph of the transfer function in the control circuit 7g shown in FIGS. 6 and 7. FIG. 6 is the graph showing the gain characteristic and FIG. 7 the graph showing the phase characteristic. The vertical axis of the gain characteristic graph represents the gain [dB] and the horizontal axis the frequency [Hz]. The vertical axis of the phase characteristic graph represents the phase [°] and the horizontal axis the frequency [Hz]. Furthermore, the transfer function in the control circuit 7g is calculated using G of "1" as the transfer function of the multiplier 12g.

As shown in FIG. 6, the gain of the transfer function in the control circuit 7g decreases at the rate of −20 [dB/dec]. This is because the transfer function Gc of the control circuit 7g is proportional to the frequency f, as seen from Eq. 9.

As shown in FIG. 7, the phase of the transfer function in the control circuit 7g is 90° in the frequency band smaller than the predetermined frequency (near 10 kHz in the case of FIG. 7). This indicates that the phase of the transfer function in the control circuit 7g leads by the phase lead of 90°.

The above verifies that, since the controller IC 7 in the present embodiment is provided with the integrator 32 in the operation circuit 30 in the feedback loop, the transfer function of the controller IC 7 is expressed by the transfer function of the first-order high-pass filter, as in the case of the above-described control circuit 5g, so as to enable implementation of the phase lead of 90°.

Incidentally, the gain of the transfer function in the aforementioned control circuit 7g decreases at the rate of −20 [dB/dec]. This indicates that the DC gain of the transfer function in the control circuit 7g theoretically becomes −∞ [dB]. The DC gain is a value of the gain of the transfer function where the frequency f boundlessly approaches 0. It is generally known that the necessary DC gain of the entire system including the control circuit is approximately 20 [dB] to 60 [dB]. Therefore, it is necessary to design the components of the circuit so that the DC gain of the entire system falls in the range of approximately 20 [dB] to 60 [dB]. In the present embodiment, therefore, the operation circuit 30 is provided with the high-pass filter 31, so as to cut off the low-frequency component of the feedback signal through the feedback loop and thereby prevent the decrease of gain.

Described below with reference to FIGS. 8 to 17 are the gain characteristics and phase characteristics of the transfer functions in the controller IC 7 and in the switching power supply 1 in the present embodiment. It is assumed that the input voltage Vi of the switching power supply 1 is set at 10 V. The vertical axis of each gain characteristic graph represents the gain [dB] and the horizontal axis the frequency [Hz]. The vertical axis of each phase characteristic graph represents the phase [°] and the horizontal axis the frequency [Hz]. Furthermore, the transfer function in the controller IC 7 is calculated using G of "1" as the transfer function of the multiplier 12.

Figure 8:
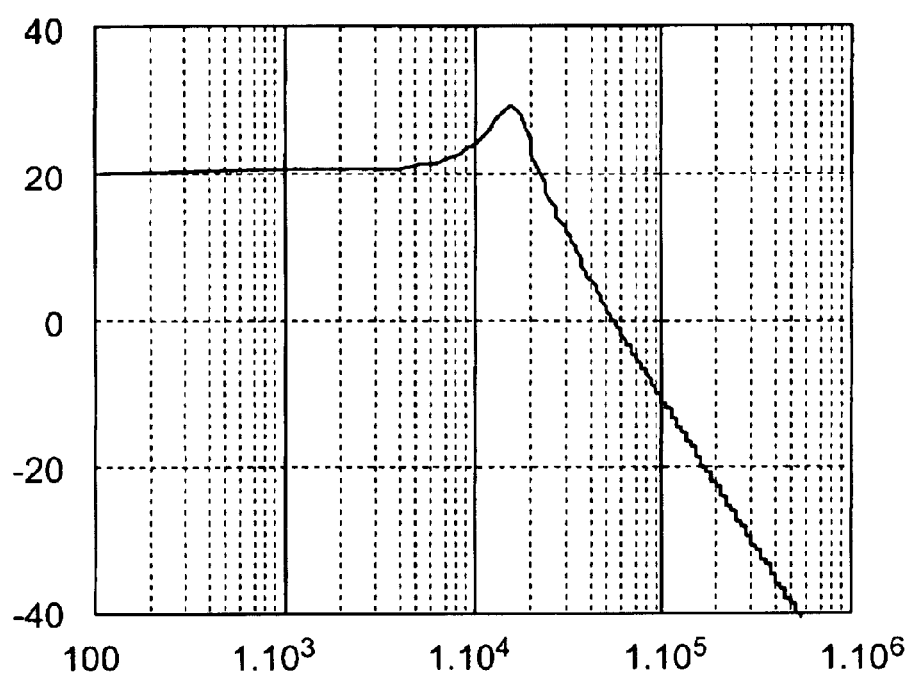
FIG. 8 is a graph showing the gain characteristic of the transfer function in the main body of the switching power supply.
Figure 9:
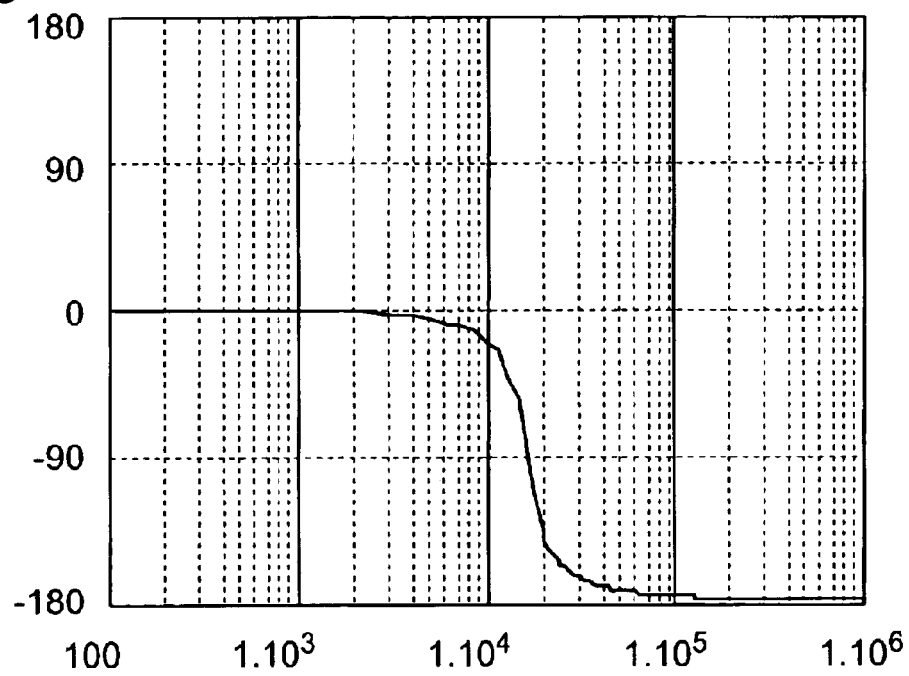
FIG. 9 is a graph showing the phase characteristic of the transfer function in the main body of the switching power supply.

First described with reference to FIGS. 8 and 9 are the gain characteristic and phase characteristic of the transfer function in the main body of the switching power supply 1 excluding the controller IC 7. FIG. 8 is the graph showing the gain characteristic and FIG. 9 the graph showing the phase characteristic.

As shown in FIG. 8, a maximum (resonance value) of the gain of the transfer function in the main body of switching power supply 1 appears at 15 [kHz] being the LC resonance frequency fn of the main body of switching power supply 1. The zero-cross frequency where the gain is 0 [dB] is 55 [kHz].

As shown in FIG. 9, the phase of the transfer function in the main body of switching power supply 1 is −175[°] at 55 [kHz] being the zero-cross frequency. Accordingly, the phase margin of the main body of switching power supply 1 is 5[°], which is a very small value as a phase margin. Therefore, the output voltage Vo may oscillate because of external influence (disturbance).

Figure 10:
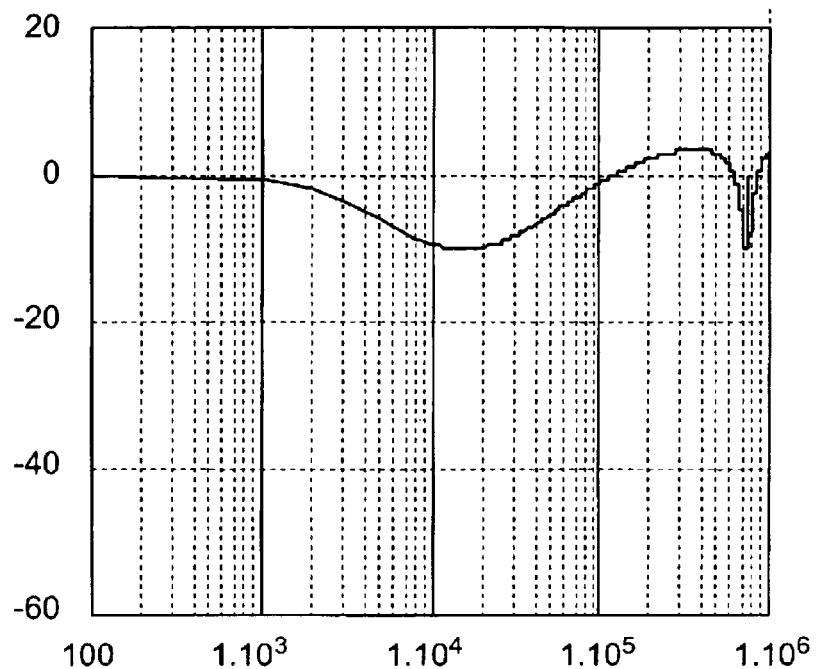
FIG. 10 is a graph showing the gain characteristic of the transfer function in the controller IC.
Figure 11:
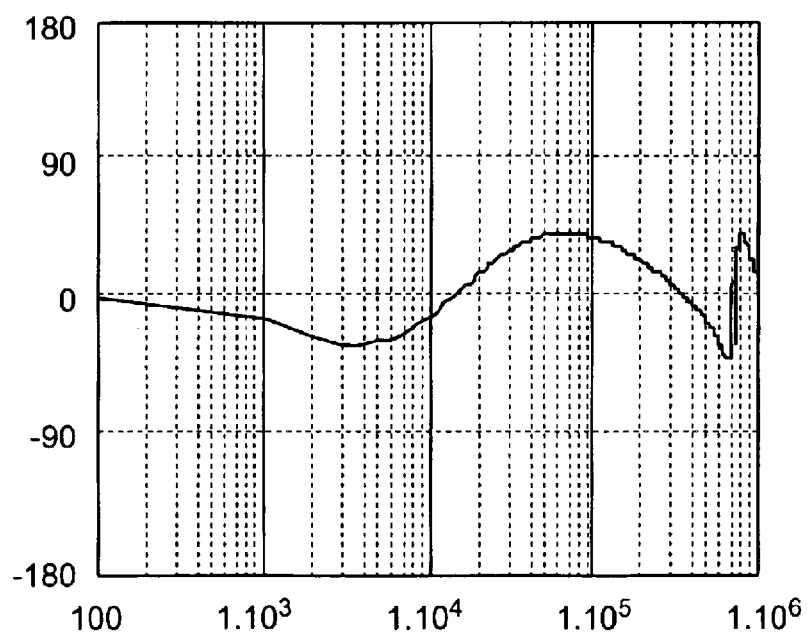
FIG. 11 is a graph showing the phase characteristic of the transfer function in the controller IC.

The gain characteristic and phase characteristic of the transfer function in the controller IC 7 will be described below with reference to FIGS. 10 and 11. FIG. 10 is the graph showing the gain characteristic and FIG. 11 the graph showing the phase characteristic. As shown in FIG. 10 and FIG. 11, the gain characteristic and phase characteristic of the transfer function of the controller IC 7 indicate that the gain returns to 0 [dB] and the phase to 0[°] in the frequency region where the low-frequency component is cut off by the second-order high-pass filter 31, in the respective characteristic graphs in the aforementioned case of only the integrator shown in FIGS. 6 and 7. If the DC gain is insufficient, a necessary DC gain can be attained by changing G as the transfer function of the multiplier 12 to a transfer function having a high gain in the low frequency region.

Figure 12:
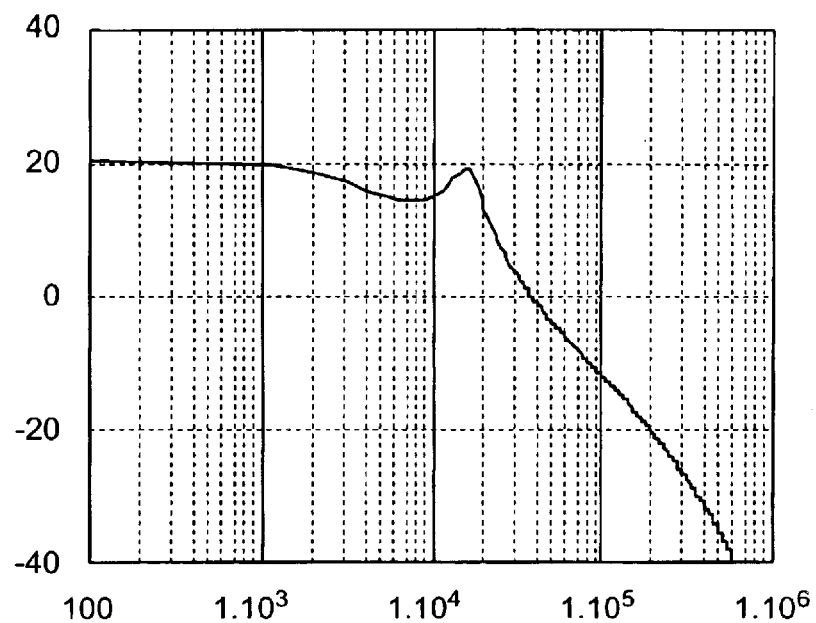
FIG. 12 is a graph showing the gain characteristic of the transfer function in the entire switching power supply including the controller IC.
Figure 13:
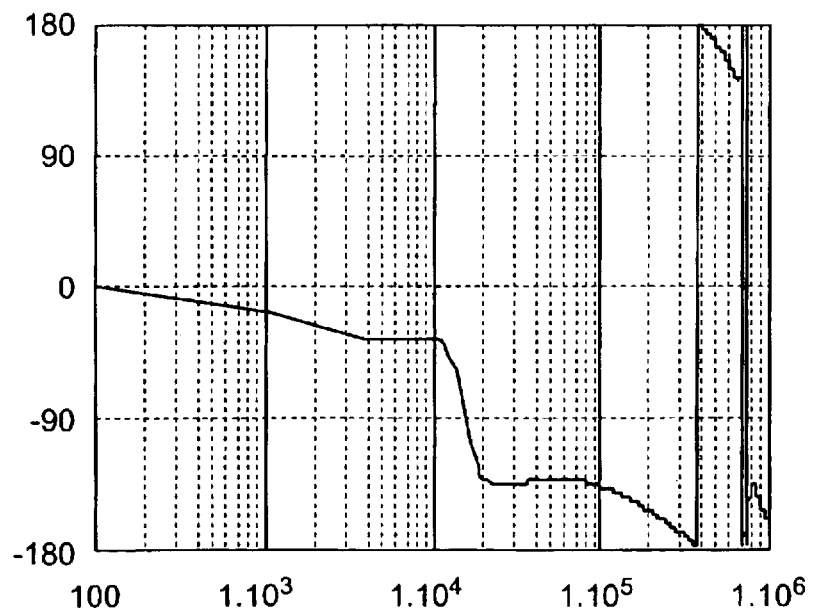
FIG. 13 is a graph showing the phase characteristic of the transfer function in the entire switching power supply including the controller IC.

The gain characteristic and phase characteristic of the transfer function in the entire switching power supply 1 including the controller IC 7 will be described below with reference to FIGS. 12 and 13. FIG. 12 is the graph showing the gain characteristic and FIG. 13 the graph showing the phase characteristic. The characteristic graphs shown in FIG. 12 and FIG. 13 indicate the gain characteristic and the phase characteristic of the transfer function resulting from multiplication of the transfer function in the entire switching power supply 1 (cf. FIGS. 8 and 9) by the transfer function in the controller IC 7 (cf. FIGS. 10 and 11).

As shown in FIG. 12, the zero-cross frequency where the gain of the transfer function in the entire switching power supply 1 is 0 [dB], is 35 [kHz]. As shown in FIG. 13, the phase of the transfer function in the entire switching power supply 1 is −130[°] at 35 [kHz] being the zero-cross frequency. Therefore, the phase margin of the entire switching power supply 1 is 50[°], so that the switching power supply 1 becomes a stable control system as a whole. Since the DC gain is 20 [dB], as shown in FIG. 12, the steady-state deviation also decreases as a whole of the switching power supply 1.

Figure 14:
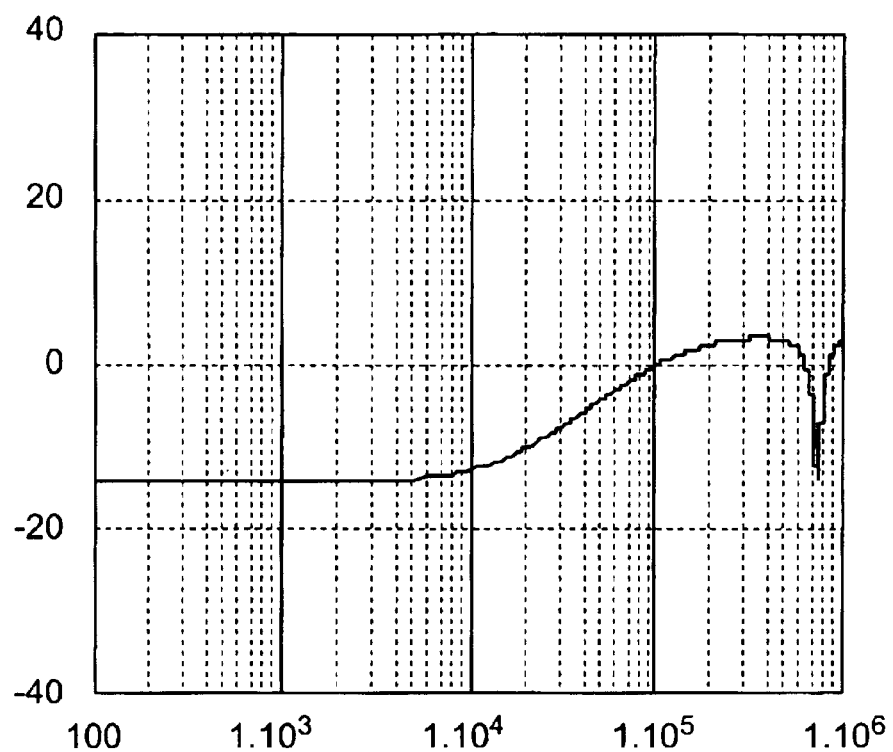
FIG. 14 is a graph showing the gain characteristic of the transfer function in the controller IC having a first-order high-pass filter.
Figure 15:
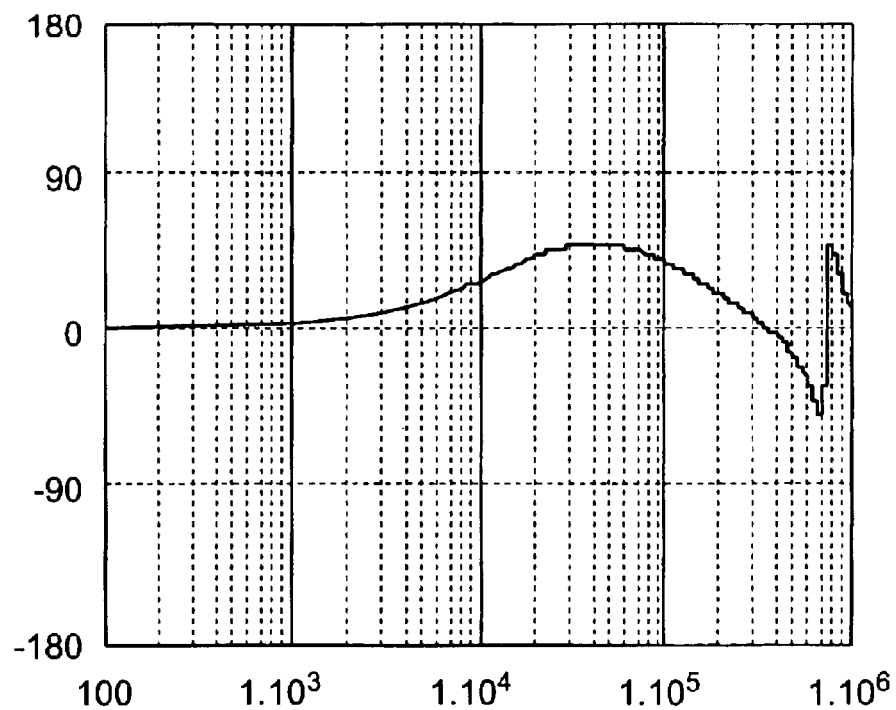
FIG. 15 is a graph showing the phase characteristic of the transfer function in the controller IC having a first-order high-pass filter.

Next described with reference to FIGS. 14 and 15 are the gain characteristic and phase characteristic of the transfer function in the controller IC 7 in the case where the high-pass filter of the operation circuit 30 is a first-order high-pass filter 31S. FIG. 14 is the graph showing the gain characteristic, and FIG. 15 the graph showing the phase characteristic. As shown in FIGS. 14 and 15, the gain characteristic and the phase characteristic of the transfer function of the controller IC 7 indicate that the gain returns to −15 [dB] and the phase to 0[°] in the frequency region where the low-frequency component is cut off by the first-order high-pass filter 31, in the respective characteristic graphs in the aforementioned case of only the integrator shown in FIGS. 6 and 7. Although the effect is lower than in the case using the second-order high-pass filter, the steady-state deviation is considerably improved in that the DC gain is −15 [dB] with use of the first-order high-pass filter, as compared with the case of only the integrator (cf. FIG. 6) where the DC gain was −∞ [dB].

Figure 16:
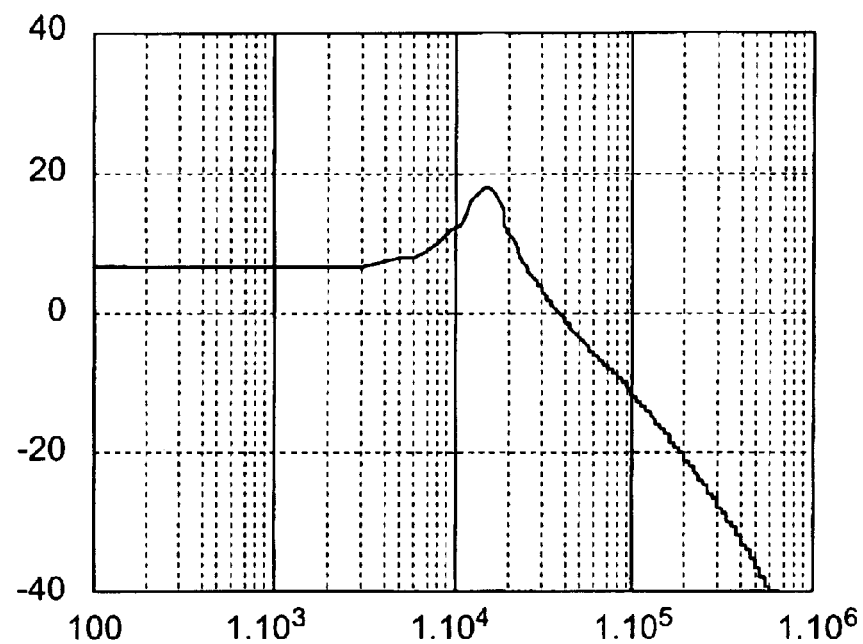
FIG. 16 is a graph showing the gain characteristic of the transfer function in the entire switching power supply including the controller IC having a first-order high-pass filter.
Figure 17:
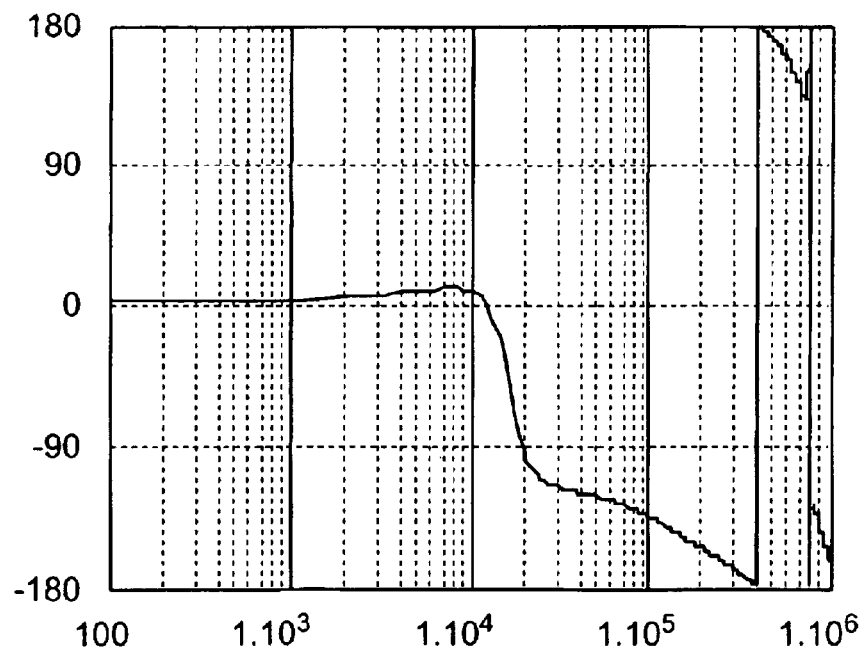
FIG. 17 is a graph showing the phase characteristic of the transfer function in the entire switching power supply including the controller IC having a first-order high-pass filter.

Described below with reference to FIG. 16 and FIG. 17 are the gain characteristic and phase characteristic of the transfer function in the entire switching power supply 1 including the controller IC 7 in the case using the first-order high-pass filter 31S. FIG. 16 is the graph showing the gain characteristic and FIG. 17 the graph showing the phase characteristic. The characteristic graphs shown in FIGS. 16 and 17 indicate the gain characteristic and phase characteristic of the transfer function resulting from multiplication of the transfer function in the entire switching power supply 1 (cf. FIGS. 8 and 9) by the transfer function in the controller IC 7 in the case using the first-order high-pass filter 31S (cf. FIGS. 14 and 15). As shown in FIG. 16, the zero-cross frequency where the gain of the transfer function in the entire switching power supply 1 is 0 [dB], is 35 [kHz]. As shown in FIG. 17, the phase of the transfer function in the entire switching power supply 1 is −120[°] at 35 [kHz] being the zero-cross frequency. Therefore, the phase margin of the entire switching power supply 1 is 60[°], so that the switching power supply 1 becomes a stable control system as a whole. As shown FIG. 16, since the DC gain is 5 [dB], the steady-state deviation also decreases as a whole of the switching power supply 1.

Since the operation circuit 30 in the feedback loop of the controller IC 7 is provided with the integrator 32 and the high-pass filter 31 or 31S as described above, the transfer function of the controller IC 7 has the phase lead and also secures the DC gain, so as to implement the phase compensation in the switching power supply 1.

Figure 18:
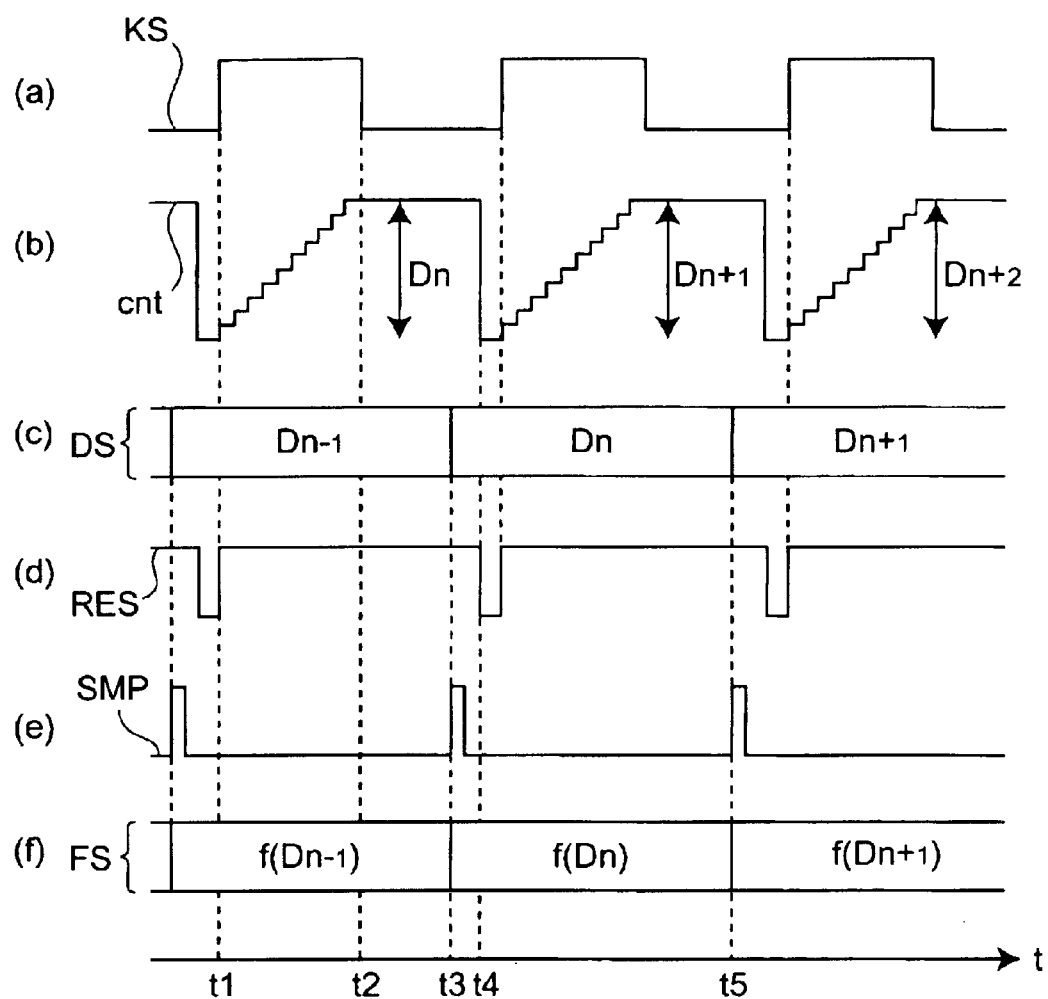
FIG. 18 is a timing chart to illustrate the flow of signals at a counter and at the operation circuit.

The flow of signals at the counter 14 and at the operation circuit 30 of the controller IC 7 will be described below with reference to the timing chart shown in FIG. 18. FIG. 18(*a*) is an illustration showing the waveform of the PWM signal KS outputted from the PWM signal generating circuit 20 of the controller IC 7. As shown in FIG. 18(*a*), the PWM signal KS is outputted while alternately repeating signals at the low level and at the high level. FIG. 18(*b*) is an illustration showing the waveform of the signal cnt indicating a count-up state in the counter 14 of the controller IC 7. FIG. 18(*c*) is an illustration showing the contents of the signal DS outputted from the counter 14. FIG. 18(*d*) is an illustration showing the pulse waveform of the reset signal RES generated based on the master clock MC of the switching power supply 1. As shown in FIG. 18(*d*), the reset signal RES is outputted while alternately repeating signals at the low level and at the high level at predetermined intervals. FIG. 18(*e*) is an illustration showing the pulse waveform of the sample signal SMP generated based on the master clock MC of the switching power supply 1. As shown in FIG. 18(*e*), the sample signal SMP is outputted while alternately repeating signals at the low level and at the high level at predetermined intervals. FIG. 18(*f*) is an illustration showing the contents of the signal FS outputted from the operation circuit 30 of the controller IC 7.

First, when at a time t1 the PWM signal KS outputted from the PWM signal generating circuit 20 is switched from the low level to the high level (FIG. 18(*a*)), the counter 14 starts counting up the count value after reset (FIG. 18(*b*)). At the time t1, the reset signal RES is also switched from the low level to the high level (FIG. 18(d)).

When at a time t2 the PWM signal KS outputted from the PWM signal generating circuit 20 is then switched from the high level to the low level (FIG. 18(a)), the counter 14 stops the count-up operation (FIG. 18(b)). Namely, the counter 14 in the present embodiment counts an on time of the PWM signal KS.

When at a time t3 the sample signal SMP is then switched from the low level to the high level (FIG. 18(e)), the counter 14 outputs the signal DS indicating "Dn" as a count value at the present time (FIG. 18(c)). This "Dn" being the output content of the signal DS is retained until the sample signal is next switched from the low level to the high level (time t5).

When at the time t3 the content of the signal DS outputted from the counter 14 is switched from "Dn−1" to "Dn" (FIG. 18(c)), the content of the signal FS outputted from the operation circuit 30 is switched from "f(Dn−1)" to "f(Dn)" (FIG. 18(f)). "f(x)" herein is a function representing the content of the operation carried out in the operation circuit 30.

When at a time t4 the reset signal RES is then switched from the high level to the low level (FIG. 18(d)), the counter 14 resets the count value (FIG. 18(b)). This enables the counter 14 to start the counting operation in the next switching period from the count value after reset.

The flow of signals at the PWM signal generating circuit 20 of the controller IC 7 will be described below with reference to the timing chart shown in FIG. 19. FIG. 19(a) is an illustration showing the waveform of the ramp signal RS outputted from the ramp signal circuit 15 of the controller IC 7, and the signal HS outputted from the adder 13 of the controller IC 7. As shown in FIG. 19(a), the waveform of the ramp signal RS in the present embodiment is outputted in a sawtooth shape. FIG. 19(b) is an illustration showing the pulse waveform of the reset signal RES generated based on the master clock MC of the switching power supply 1. As shown in FIG. 19(b), the reset signal RES is outputted while alternately repeating signals at the low level and at the high level at predetermined intervals. FIG. 19(c) is an illustration showing the waveform of the signal CS outputted from the comparator 21 of the controller IC 7. As shown in FIG. 19(c), the signal CS is outputted while alternately repeating signals at the low level and at the high level. FIG. 19(d) is an illustration showing the pulse waveform of the signal clk generated based on the master clock MC of the switching power supply 1. As shown in FIG. 19(d), the signal clk is outputted while repeating signals at the low level and at the high level at predetermined intervals. FIG. 19(e) is an illustration showing the waveform of the PWM signal KS outputted from the PWM signal generating circuit 20 of the controller IC 7.

First, when at a time t11 the reset signal RES is switched from the high level to the low level (FIG. 19(b)), the ramp signal circuit 15 resets the value of the ramp signal RS outputted therefrom (FIG. 19(a)). When at the time t11 the value of the ramp signal RS is reset, the comparator 21 outputs the signal CS at the high level (FIG. 19(c)). This comparator 21 compares the signal HS outputted from the adder 13, with the ramp signal RS outputted from the ramp signal circuit 15, and outputs the signal CS at the high level during a period in which the value of the signal HS is larger than the value of the ramp signal RS (e.g., during a period from t11 to t13) but outputs the signal CS at the low level during a period in which the value of the signal HS is not more than the value of the ramp signal RS (e.g., a period from t13 to t15) (FIG. 19(c)).

When at a time t12 the reset signal RES is then switched from the low level to the high level (FIG. 19(b)), the ramp signal circuit 15 starts or restarts outputting the ramp signal RS to be counted up (FIG. 19(a)).

When at the time t12 the signal clk is switched from the low level to the high level (FIG. 19(d)), the PWM signal KS outputted from the PWM signal generating circuit 20 turns from the off state (low level) to the on state (high level).

When at a time t13 the value of the signal HS then becomes not more than the value of the ramp signal RS (FIG. 19(a)), the signal CS outputted from the comparator 21 turns from the high level to the low level (FIG. 19(c)). When the signal CS outputted from the comparator 21 turns from the high level to the low level (FIG. 19(c)), the PWM signal KS outputted from the AND circuit 22 turns from the high level to the low level (FIG. 19(e)). Namely, when the value of the ramp signal RS reaches the value of the HS signal, the PWM signal KS being the drive signal turns from the on state (high level) to the off state (low level).

When at a time t14 the signal clk is then switched from the high level to the low level (FIG. 19(d)), the PWM signal KS outputted from the AND circuit 22 is forced to the low level (FIG. 19(e)). Namely, the signal clk has a function of limiting a period in which the PWM signal KS being the drive signal remains on.

Accordingly, the PWM generating circuit 20 operates to switch the PWM signal KS from the off state to the on state when the value of the signal HS is determined to be larger than the value of the ramp signal RS (FIG. 19(a)) after switching of the signal clk from the low level to the high level (FIG. 19(d)), and to switch the PWM signal KS from the on state to the off state when the value of the ramp signal RS is determined to reach the value of the signal HS (FIG. 19(a)).

In the switching power supply 1 in the present embodiment, as described above, the high-pass filter 31 and the integrating means 32 in the feedback loop cut off the low-frequency component from the signal corresponding to an on time of the PWM signal KS and integrate the signal resulting from the cutoff, and the drive signal is generated on the basis of the signal after the integration; therefore, the transfer function of the controller IC 7 is expressed as a transfer function of a first-order high-pass filter, so as to enable implementation of the phase lead of 90° and also secure the DC gain.

Second Embodiment

The second embodiment of the present invention will be described. The second embodiment is different in part of the configuration of the controller IC from the first embodiment. Accordingly, only differences from the first embodiment will be detailed below and the components similar to those in the first embodiment will be denoted by the same reference symbols, without redundant description thereof.

Figure 20:
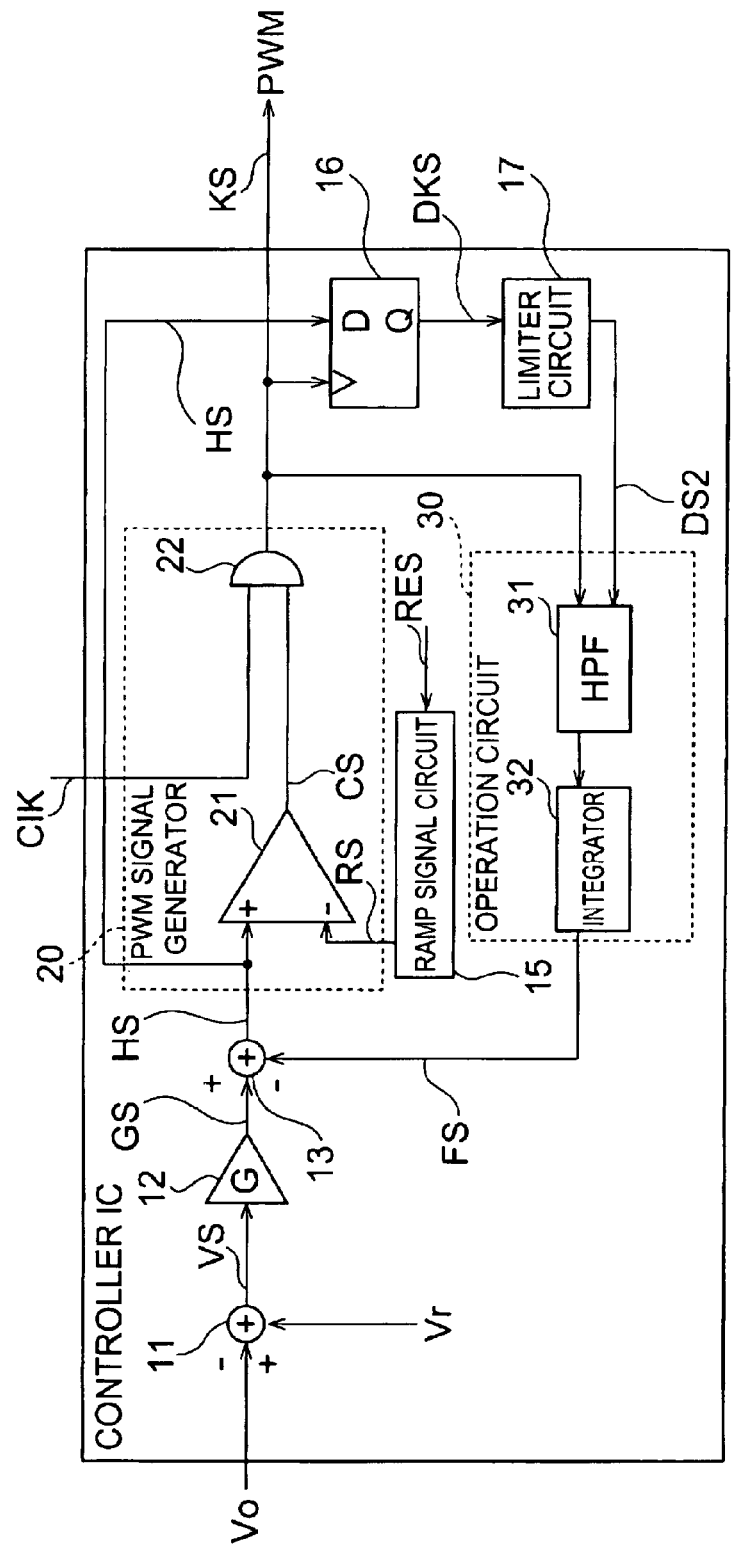
FIG. 20 is a circuit diagram showing a circuit configuration of a controller IC in the second embodiment.

First, the configuration of the controller IC 7S in the second embodiment will be described with reference to FIG. 20. As shown in FIG. 20, the controller IC 7S in the second embodiment is different from the configuration of the controller IC 7 in the first embodiment in that it further comprises a D flip-flop 16 (delay means) being a delay device, and a limiter circuit 17 and in that the counter 14 is excluded.

The D flip-flop 16 outputs a signal DKS, based on the signal HS outputted from the adder 13 and the PWM signal KS outputted from the PWM signal generating circuit 20. Namely, the D flip-flop 16 receives the signal HS as a D signal and the PWM signal KS as a clock signal, and outputs the signal DKS as a Q signal.

The limiter circuit 17 has a function corresponding to the AND circuit 22 and has a function of limiting the upper limit of the pulse width of the signal DKS outputted from the D flip-flop 16, similar to function of limiting the pulse width in the AND circuit 22.

Figure 21:
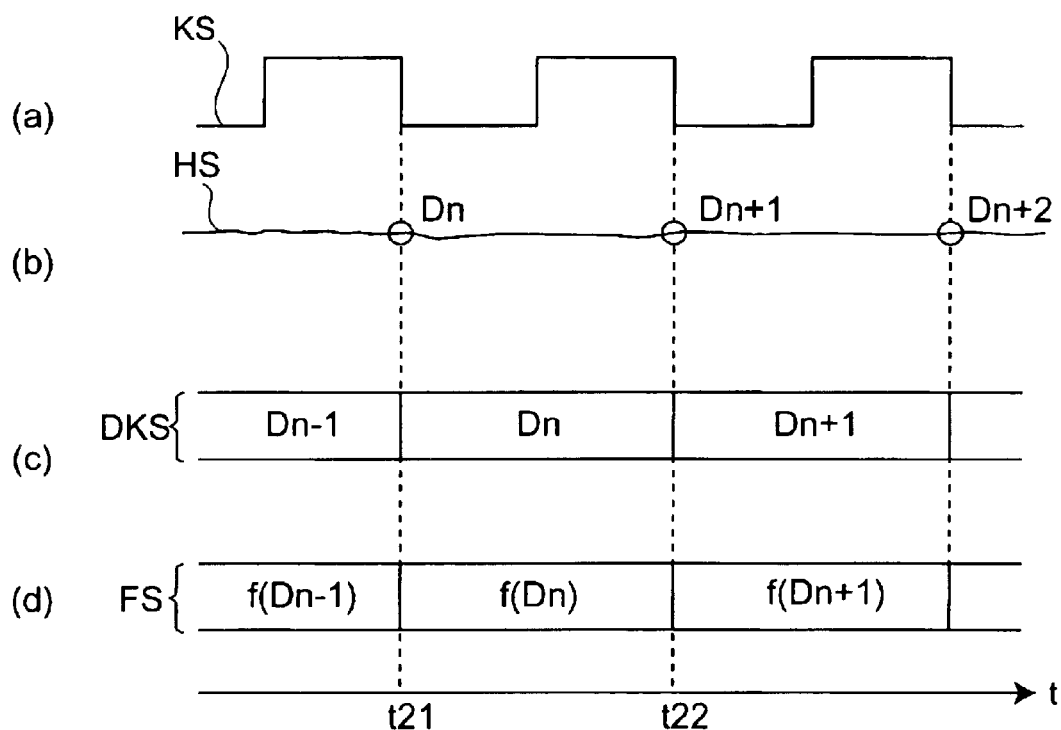
FIG. 21 is a timing chart to illustrate the flow of signals at a D flip-flop and at an operation circuit in the second embodiment.

The flow of signals at the D flip-flop 16 and at the operation circuit 30 of the controller IC 7S will be described below with reference to the timing chart shown in FIG. 21. FIG. 21(a) is an illustration showing the waveform of the PWM signal KS outputted from the PWM signal generating circuit 20 of the controller IC 7S. FIG. 21(b) is an illustration showing the signal HS outputted from the adder 13 of the controller IC 7S. FIG. 21(c) is an illustration showing the contents of the signal DKS outputted from the D flip-flop 16. FIG. 21(d) is an illustration showing the contents of the signal FS outputted from the operation circuit 30 of the controller IC 7S.

When at a time t21 the PWM signal KS outputted from the PWM signal generating circuit 20 is first switched from the high level to the low level (FIG. 21(a)), the D flip-flop 16 outputs the signal DKS indicating "Dn" being the value of the signal HS at that point (FIG. 21(b) and (c)). This "Dn" being the output content of the signal DKS is retained until the PWM signal KS is next switched from the high level to the low level (time t22). Namely, at the time t22, the D flip-flop 16 outputs the signal DKS indicating "Dn+1" being the value of the signal HS at that point (FIG. 21(b) and (c)).

When at the time t21 the content of the signal DKS outputted from the D flip-flop 16 is switched from "Dn−1" to "Dn" (FIG. 21(c)), the content of the signal FS outputted from the operation circuit 30 turns from "f(Dn−1)" to "f(Dn)" (FIG. 21(d)). After the signal DKS outputted from the D flip-flop 16 is limited by the limiter, the signal DS2 is fed into the operation circuit 30.

Since the flow of signals at the PWM signal generating circuit 20 of the controller IC 7S is much the same as in the first embodiment, the description thereof is omitted herein.

In the switching power supply 1 in the second embodiment, as described above, the high-pass filter 31 and the integrating means 32 existing in the feedback loop cut off the low-frequency component from the signal outputted from the D flip-flop 16, and integrate the signal after the cutoff, and the drive signal is generated on the basis of the signal after the integration; therefore, the transfer function of the controller IC 7S is expressed as a transfer function of a first-order high-pass filter, so as to enable implementation of the phase lead of 90° and also secure the DC gain.

In the first embodiment and the second embodiment described above, the timing when the PWM signal KS outputted from the PWM signal generating circuit 20 is switched from the low level to the high level, is fixed, and the timing when the PWM signal KS is switched from the high level to the low level, is controlled based on the signal HS outputted from the adder 13 and the ramp signal RS outputted from the ramp signal circuit 15. It is, however, noted that the timing of the switching of the PWM signal KS is not limited to this. For example, another potential configuration is such that the timing when the PWM signal KS is switched from the high level to the low level, is fixed and the timing when the PWM signal KS is switched from the low level to the high level, is controlled based on the signal HS outputted from the adder 13 and the ramp signal RS outputted from the ramp signal circuit 15. In this case, the D flip-flop 16 in the second embodiment described above may be configured to output the signal DKS corresponding to the value of the signal HS at the time of switching the PWM signal KS from the low level to the high level.

The aforementioned controller IC (switching power supply controller) and switching power supply in each of the first embodiment and the second embodiment described above are able to achieve the phase lead and thereby implement the phase compensation.

Third Embodiment

The third embodiment of the present invention will be described below. The third embodiment is different in part of the configuration of the controller IC from the first embodiment described above.

Before describing the configuration in the third embodiment, we will describe problems to be solved by the invention corresponding to the third embodiment. In addition to the problem to be solved by the invention corresponding to the aforementioned first embodiment and second embodiment, the problems to be solved by the invention corresponding to the third embodiment include a problem described below. In the conventional switching power supplies, first, the duty ratio of the drive signal varies with change in the input voltage or the load current. For this reason, the switching power supplies come to change the output voltage according to the change of the duty ratio and there arises the steady-state deviation against the change of the input voltage or the like. Accordingly, the conventional switching power supplies failed to ensure the stable output voltage against change of the input voltage or the load current.

With change of the input voltage, the conventional switching power supplies change the gain of the entire system according to the change. For this reason, where the input voltage is low, the gain of the entire system becomes so small as to increase the steady-state deviation and worsen the response. On the other hand, where the input voltage is high, the gain of the entire system becomes so large as to raise the risk of oscillation of the output voltage. In cases where a wide input voltage range is set as a specification for the switching power supply, normally, the controller has to be designed so as to avoid oscillation and it is thus common practice to set the gain, assuming the case of high input voltage. Namely, the gain is set at a relatively low value. In that case the oscillation can be avoided at high input voltages, but the response becomes worse at low input voltages.

In order to solve the problems as described above, it is, therefore, an object of the invention corresponding to the third embodiment and subsequent embodiments to provide a switching power supply controller (controller IC) and a switching power supply capable of achieving the phase lead to implement the phase compensation, ensuring a stable output voltage even with change in the input voltage or the load current, and stabilizing the gain of the entire system even with change in the input voltage.

In the description below, only differences from the first embodiment will be detailed and the components similar to those in the first embodiment will be denoted by the same reference symbols, without redundant description thereof.

The circuit configuration of the controller IC 7T will be described with reference to FIG. 22. As shown in FIG. 22, the controller IC 7T has an adder 11, a multiplier 12, a multiplier (multiplying means) 18, an adder (adding means) 19, a PWM signal generating circuit (drive signal generating means) 20, a counter 14, an operation circuit 30, a low-pass filter (averaging means) 1A, a divider (gain adjustment value calculating means) 1B, and a ramp signal circuit 15.

Since the adder 11, multiplier 12, PWM signal generating circuit 20, counter 14, operation circuit 30, and ramp signal circuit 15 shown in FIG. 22 have their respective functions similar to those of the corresponding circuits in the first embodiment, the description thereof is omitted herein. It is noted that the "signal HS outputted from the adder 13" used in the description in the first embodiment should read a "signal IS outputted from the adder 19" in the description in the third embodiment.

The multiplier 18 outputs the control signal HS on the basis of the control signal GS indicating the value of G(Vr−Vo) outputted from the multiplier 12 and a signal ES outputted from the divider 1B. Namely, the multiplier 18 multiplies the control signal GS indicating the value of G(Vr−Vo), by the signal ES outputted from the divider 1B to calculate the control signal HS.

The adder 19 outputs a signal IS on the basis of the control signal HS outputted from the multiplier 18, a signal AS outputted from the low-pass filter 1A, and a signal FS outputted from the operation circuit 30. Namely, the adder 19 adds up the control signal HS (positive) outputted from the multiplier 18, the signal AS (positive) outputted from the low-pass filter 1A, and the signal FS (negative) outputted from the operation circuit 30 to calculate the signal IS indicating a value obtained by subtracting the signal FS from the sum of the control signal HS and the signal AS.

The low-pass filter 1A is a first-order low-pass filter of the IIR [Infinite Impulse Response] type and unlimitedly averages duty ratios D of the PWM signal KS received in the past, by the averaging function of this filter. Namely, the low-pass filter 1A calculates an average Da of duty ratios D on the basis of the signal DS indicating the count value from the counter 14 and outputs a signal AS corresponding to this average Da. The duty ratio D herein refers to a rate of an on time in one switching period of the PWM signal KS being the drive signal.

Figure 23A:
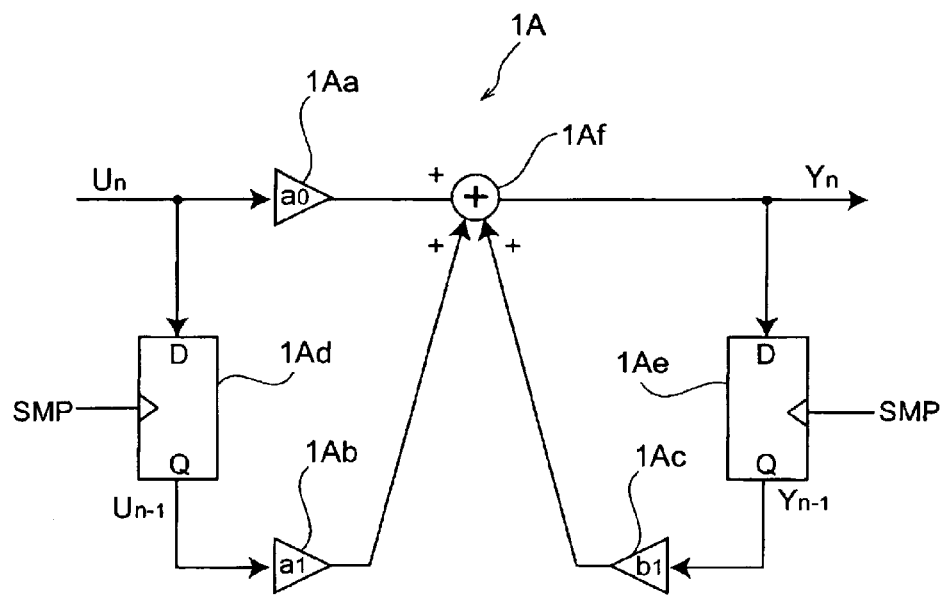
FIG. 23A is a circuit diagram showing a detailed circuit configuration of a low-pass filter in the third embodiment.
Figure 23B:
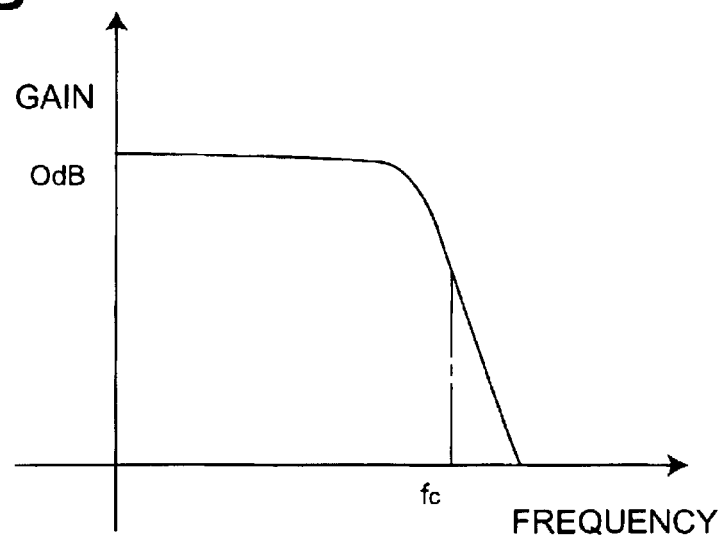
FIG. 23B is a frequency-gain characteristic diagram of the low-pass filter in the third embodiment.

As shown in FIG. 23A, the low-pass filter 1A has multipliers 1Aa, 1Ab, 1Ac, D flip-flops 1Ad, 1Ae, and an adder 1Af. The multiplier 1Aa multiplies an input value Un by a filter coefficient a0 and outputs the product to the adder 1Af. The D flip-flop 1Ad receives an input value Un, retains a right previous value Un−1 of the input value on the basis of the sample signal SMP, and outputs Un−1 to the multiplier 1Ab. The multiplier 1Ab multiplies the right previous value Un−1 of the input value by a filter coefficient a1 and outputs the product to the adder 1Af. The D flip-flop 1Ae receives an output value Yn, retains a right previous value Yn−1 of the output value on the basis of the sample signal SMP, and outputs Yn−1 to the multiplier 1Ac. The multiplier 1Ac multiplies the right previous value Yn−1 of the output value by a filter coefficient b1 and outputs the product to the adder 1Af. The adder 1Af adds up the products obtained by the respective multipliers 1Aa-1Ac, and outputs the result as an output value Yn. The low-pass filter 1A has a cutoff frequency fc, has a gain characteristic to pass low-frequency components, as shown in FIG. 23B, and has the gain of 1.

The low-pass filter 1A is represented by Eq. 10 below.

$$Yn = a0*Un + a1*(Un-1) + b1*(Yn-1) \quad \text{(Eq. 10)}$$

(a0, a1, and b1 are coefficients)

In Eq. 10, Un represents the duty ratio Dn from the counter 14, and Yn the average Da of duty ratios received in the past.

The divider 1B shown in FIG. 22 outputs the signal ES indicating a value of (Da/Vr), based on a digital signal indicating the target voltage Vr and a signal indicating the average Da of duty ratios D. Namely, the divider 1B divides the average Da of duty ratios D by the target voltage Vr to calculate a quotient (Da/Vr) as a gain adjustment value.

The controller IC 7 configured as described above is characterized by possession of ① a phase compensation function by a phase lead, ② a correction function for steady-state deviation, and ③ a gain adjusting function according to input voltage. Each of these functions ① to ③ will be described below.

[① Phase Compensation Function by Phase Lead]

First, a circuit configuration for realizing the phase compensation function by the phase lead will be described. The circuit configuration for realizing this function is constructed, for example, of the adders 11, 19, multiplier 12, PWM signal generating circuit 20, counter 14, operation circuit 30, and ramp signal circuit 15, out of the elements constituting the controller IC 7T shown in FIG. 22. Namely, it is similar to the configuration of the controller IC 7 in the first embodiment shown in FIG. 2.

This phase compensation function by the phase lead is characterized in that the feedback loop of the controller IC 7T is provided with the high-pass filter 31 and the integrating means 32 to make the phase of the transfer function of the controller IC 7T lead by 90°, so as to implement the phase compensation for the entire switching power supply 1.

The principle of achieving the phase lead in the controller IC 7T of the present embodiment is much the same as the principle of achieving the phase lead in the controller IC 7 of the first embodiment, and thus the description is omitted herein (cf. FIGS. 5 to 7).

Since the gain characteristics and phase characteristics of the transfer functions in the controller IC 7T and in the switching power supply 1 of the present embodiment are much the same as those in the controller IC 7 and in the switching power supply 1 of the first embodiment, the description thereof is omitted herein (cf. FIGS. 8 to 17).

The flow of signals at the counter 14 and at the operation circuit 30 of the controller IC 7T in the present embodiment is also much the same as that at the counter 14 and at the operation circuit 30 of the controller IC 7 in the first embodiment, and thus the description thereof is omitted herein (cf. FIG. 18).

Figure 19:
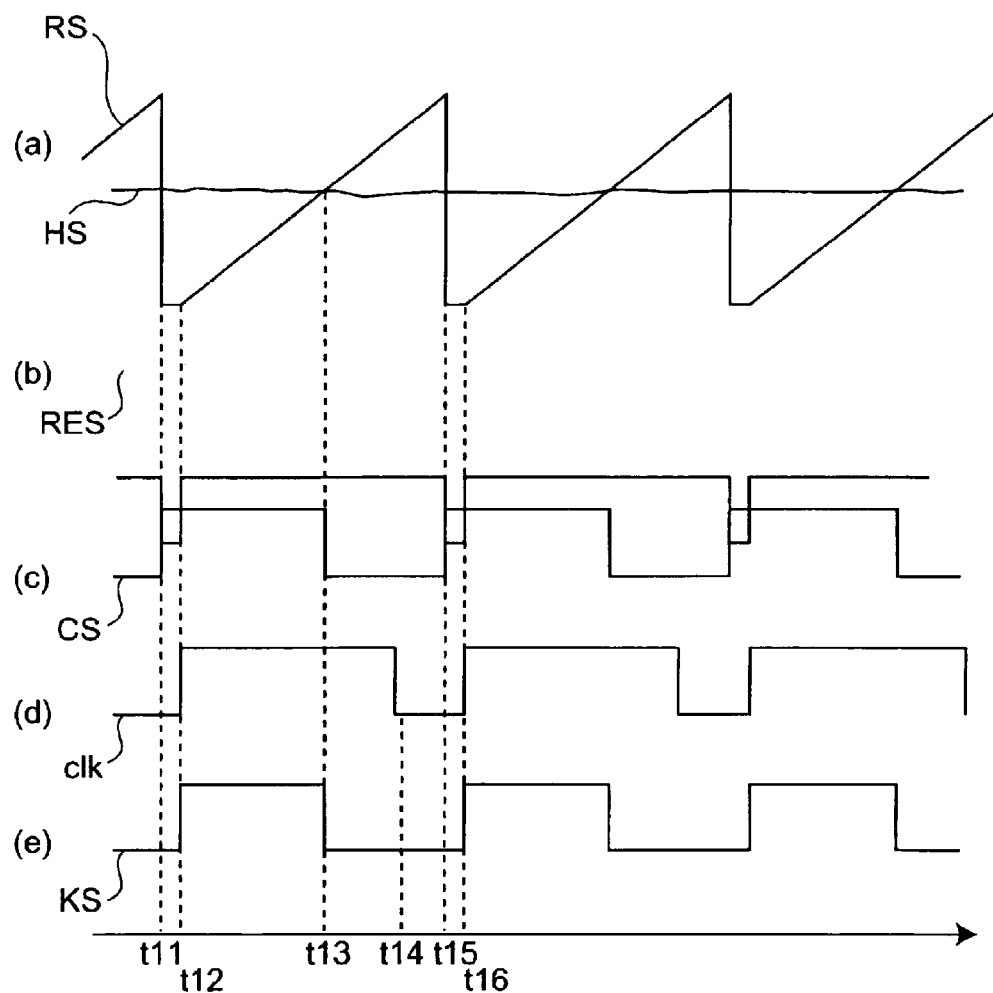
FIG. 19 is a timing chart to illustrate the flow of signals at a PWM signal generating circuit in each embodiment.

The flow of signals at the PWM signal generating circuit 20 of the controller IC 7T in the present embodiment is also much the same as that at the PWM signal generating circuit 20 of the controller IC 7 in the first embodiment, and thus the description thereof is omitted herein (cf. FIG. 19). It is noted herein that the term "signal HS outputted from the adder 13" used in FIG. 19(a) and in the description thereof should read the "signal IS outputted from the adder 19" in the description of the present embodiment.

In the controller IC 7T having the phase compensation function by the phase lead, as described above, the high-pass filter 31 and the integrating means 32 in the feedback loop cut off the low-frequency component from the signal corresponding to an on time of the PWM signal KS and integrate the signal resulting from the cutoff, and the drive signal is generated based on the signal after the integration. Accordingly, the transfer function of the controller IC 7T is expressed as a transfer function of a first-order high-pass filter, so as to enable the phase lead of 90° and also secure the DC gain.

[② Correction Function for Steady-State Deviation]

A circuit configuration for realizing the correction function for steady-state deviation will be described below. The circuit configuration for realizing this function is constructed, for example, of the adders 11, 19, multiplier 12, PWM signal generating circuit 20, counter 14, low-pass filter 1A, and ramp signal circuit 15, out of the components constituting the controller IC 7T shown in FIG. 22.

This correction function for steady-state deviation is characterized in that the feedback loop of the controller IC 7T is provided with the low-pass filter 1A and the average duty ratio Da of the PWM signal KS is fed back as a correction value for the control signal HS. As a result, it is able to stabilize the output voltage Vo of the switching power supply 1.

Described below is the reason why the output voltage Vo becomes stabilized by the feedback of the average duty ratio Da of the PWM signal KS through the feedback loop of the controller IC 7T. In the description below, a ramp coefficient of the ramp signal RS is denoted by K. As shown in FIG. 19(a) and (e), the PWM signal KS is generated so as to turn from the high level to the low level at a time when the ramp signal RS increases to equal the signal IS. Therefore, a value obtained by multiplying the duty ratio D of the PWM signal KS by the ramp coefficient K where the ramp coefficient K is 1, becomes equal to G(Vr−Vo)+Da, and thus Eq. 11 below holds.

$$G(Vr-Vo)+Da=D \qquad (\text{Eq. 11})$$

Where the ramp coefficient K is not 1, Eq. 12 below holds.

$$G(Vr-Vo)+K*Da=K*D \qquad (\text{Eq. 12})$$

By arranging Eq. 12, we obtain Eq. 13 below.

$$Vo=Vr-(K/G)*(D-Da) \qquad (\text{Eq. 13})$$

Since the controller IC 7 is assumed to have the ramp coefficient K of 1, Eq. 13 reduces to Eq. 14 below.

$$Vo=Vr-(1/G)*(D-Da) \qquad (\text{Eq. 14})$$

Here the duty ratio D and the average duty ratio Da of the PWM signal KS can be considered to be equal on a steady-state basis. From this it follows that the output voltage Vo in Eq. 13 and Eq. 14 becomes equal to the target voltage Vr (Vo=Vr), regardless of whether the gain G has a finite value, and thus it becomes constant. Namely, by adding the average duty ratio Da to the signal indicating G(Vr−Vo) to generate the duty ratio D of the PWM signal KS (cf. Eq. 11), the output voltage Vo becomes equal to the target voltage Vr (cf. Eq. 14) to become stable. Here the relation of the duty ratio D of the PWM signal KS with the input voltage Vi and output voltage Vo is given by D=Vo/Vi. Therefore, the output voltage Vo remains unchanged even if the duty ratio D varies according to change of the input voltage Vi. The output voltage Vo also stays unchanged even if the processing load of load L largely varies so as to change the load current considerably.

Figure 24:
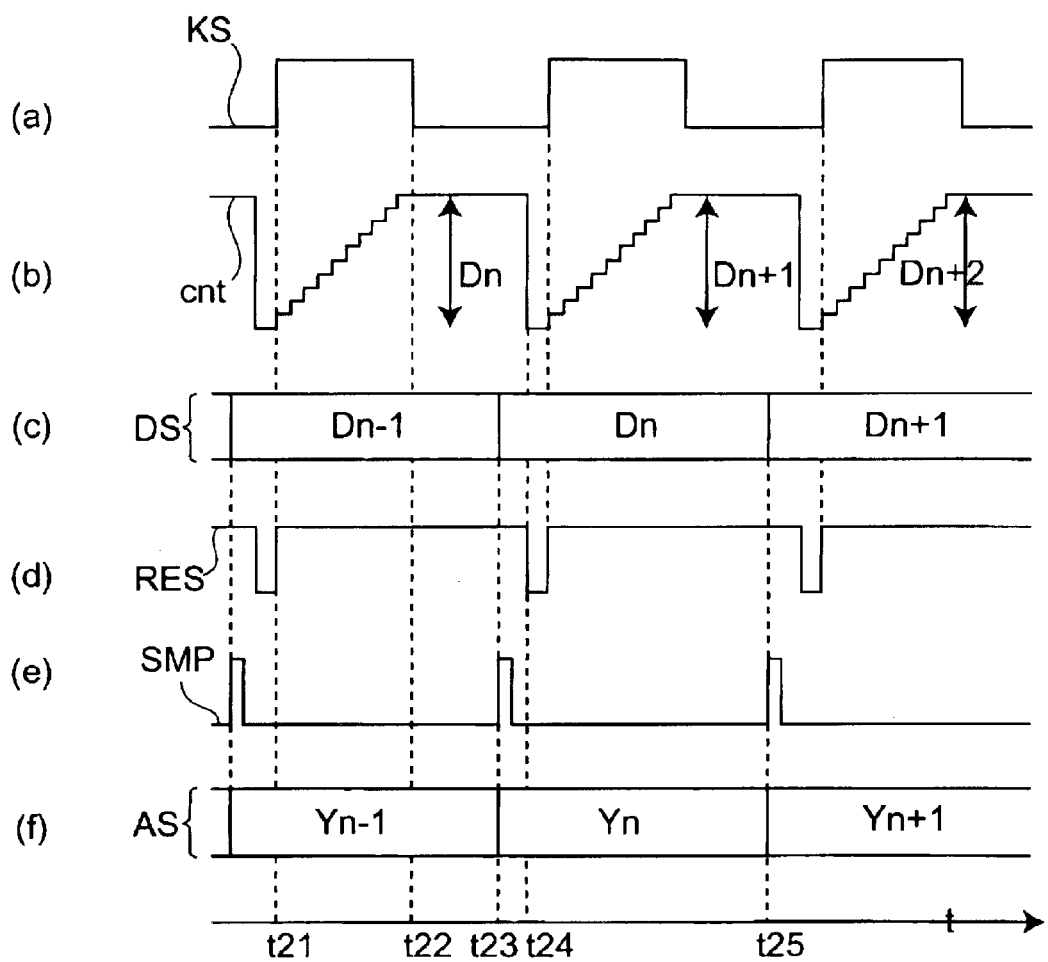
FIG. 24 is a timing chart to illustrate the flow of signals at a counter and at the low-pass filter in the third embodiment.

The flow of signals at the counter 14 and at the low-pass filter 1A of the controller IC 7T will be described below with reference to the timing chart shown in FIG. 24. FIG. 24(a) is an illustration showing the waveform of the PWM signal KS outputted from the PWM signal generating circuit 20 of the controller IC 7T. As shown in FIG. 24(a), the PWM signal KS is outputted while alternately repeating signals at the low level and at the high level. FIG. 24(b) is an illustration showing the waveform of the signal cnt indicating the count-up state in the counter 14 of the controller IC 7T. FIG. 24(c) is an illustration showing the contents of the signal DS outputted from the counter 14. FIG. 24(d) is an illustration showing the pulse waveform of the reset signal RES generated based on the master clock MC of the switching power supply 1. As shown in FIG. 24(d), the reset signal RES is outputted while alternately repeating signals at the low level and at the high level at predetermined intervals.

FIG. 24(e) is an illustration showing the pulse waveform of the sample signal SMP generated based on the master clock MC of the switching power supply 1. As shown in FIG. 24(e), the sample signal SMP is outputted while repeating signals at the low level and at the high level at predetermined intervals. FIG. 24(f) is an illustration showing the contents of the signal AS outputted from the low-pass filter 1A of the controller IC 7T.

First, when at a time t21 the PWM signal KS outputted from the PWM signal generating circuit 20 is switched from the low level to the high level (FIG. 24(a)), the counter 14 starts counting up the counter value previously reset (FIG. 24(b)). At the time t21, the reset signal RES turns from the low level to the high level (FIG. 24(d)).

When at a time t22 the PWM signal KS outputted from the PWM signal generating circuit 20 is then switched from the high level to the low level (FIG. 24(a)), the counter 14 stops the count-up operation (FIG. 24(b)). Namely, the counter 14 in the present embodiment counts an on time of the PWM signal KS.

When at a time t23 the sample signal SMP is then switched from the low level to the high level (FIG. 24(e)), the counter 14 outputs the signal DS indicating "Dn" being a count value at the present time (FIG. 24(c)). "Dn" being the output content of this signal DS is retained until the sample signal is next switched from the low level to the high level (time t25).

When at the time t23 the content of the signal DS outputted from the counter 14 is switched from "Dn−1" to "Dn" (FIG. 24(c)), the content of the signal AS outputted from the low-pass filter 1A is switched from "Yn−1" to "Yn" (FIG. 24(f)). Yn indicates an average Da of duty ratios received in the past, as indicated by Eq. 10 above. "Yn" being the output content of this signal AS is retained until the sample signal is next switched from the low level to the high level (time t25).

When at a time t24 the reset signal RES is then switched from the high level to the low level (FIG. 24(d)), the counter 14 resets the count value (FIG. 24(b)). This permits the counter 14 to initiate the counting operation in the next switching period from the count value after reset.

Since the flow of signals at the PWM signal generating circuit 20 of the controller IC 7T is similar to that in the phase compensation function by the phase lead described above (cf. FIG. 19), the description thereof is omitted herein.

In the controller IC 7T having the correction function for steady-state deviation, as described above, the duty ratio D of the PWM signal KS outputted from the controller IC 7T is fed back through the feedback loop and the control signal HS can be corrected by the average duty ratio Da. Accordingly, the output voltage Vo will have no steady-state deviation even with change in the input voltage Vi or the load current. In the controller IC 7T, the duty ratio D of the PWM signal KS is detected by the simple circuit configuration with the counter 14 and the average of duty ratios D is calculated by utilizing the averaging characteristic of the first-order low-pass filter 1A of the simple circuit configuration. Furthermore, the controller IC 7T is configured so that the ramp coefficient is set at 1, which eliminates a need for multiplication of the average pulse width Da by the ramp coefficient K in the correction.

[③ Gain Adjusting Function According to Input Voltage]

A circuit configuration for realizing the gain adjusting function according to the input voltage will be described below. The circuit configuration for realizing this function is constructed, for example, of the adder 11, multipliers 12, 18, PWM signal generating circuit 20, counter 14, low-pass filter 1A, divider 1B, and ramp signal circuit 15, out of the elements constituting the controller IC 7T shown in FIG. 22.

The gain adjusting function according to the input voltage is characterized in that the feedback loop of the controller IC 7T is provided with the low-pass filter 1A and the divider 1B and in that the gain adjustment value calculated based on the average duty ratio Da of the PWM signal KS and the target voltage Vr is fed back through the feedback loop. As a consequence, the gain of the entire switching power supply 1 can be stabilized.

Described below is the reason why the gain of the entire switching power supply 1 can be stabilized by the feedback of the above gain adjustment value through the feedback loop of the controller IC 7T. In the description below, the gain of the controller IC 7T (i.e., the gain of the control system) is represented by Gc, and the gain of the entire system including the switching power supply 1 by Ga.

The gain Gc of the controller IC 7T is a value obtained by multiplying the gain G of the multiplier 12 by the gain adjustment value and is represented by Eq. 15 below.

$$Gc = G*(Da/Vr) \quad (Eq.\ 15)$$

The gain Ga of the entire system is a value obtained by multiplying the gain Gc by the input voltage Vi and is represented by Eq. 16 below.

$$Ga = Gc*Vi \quad (Eq.\ 16)$$

The duty ratio D is a value obtained by dividing the output voltage Vo by the input voltage Vi and is represented by Eq. 17 below.

$$D = Vo/Vi \quad (Eq.\ 17)$$

By arranging Eq. 17, we obtain Eq. 18 below.

$$Vi = Vo/D \quad (Eq.\ 18)$$

The input voltage Vi represented by Eq. 18 is a value obtained by dividing the output voltage Vo by the duty ratio D. Accordingly, an average input voltage Via is a value obtained by dividing an average output voltage Voa by the average duty ratio Da and is represented by Eq. 19 below.

$$Via = Voa/Da \quad (Eq.\ 19)$$

Since the output voltage Vo is controlled by the feedback control toward the target voltage Vr, the output voltage Vo varies with respect to the target voltage Vr. Therefore, the average output voltage Voa can be assumed to be equal to the target voltage Vr. Namely, the average input voltage Via is a value obtained by dividing the target voltage Vr by the average duty ratio Da and is represented by Eq. 20 below.

$$Via = Vr/Da \quad (Eq.\ 20)$$

By determining the gain Gc of the controller IC 7T on the basis of Eq. 15 and Eq. 20 above, the gain Gc of the controller IC 7T is given by a value obtained by dividing the gain G of the multiplier 12 by the average input voltage Via and is represented by Eq. 21 below.

$$Gc = (G/Via) \quad (Eq.\ 21)$$

By determining the gain Ga of the entire system on the basis of Eq. 16 and Eq. 21 above, the gain Ga of the entire system is represented by Eq. 22 below.

$$Ga = (G/Via)*Vi \quad (Eq.\ 22)$$

Here the input voltage Vi and the average input voltage Via can be considered to be equal on a steady-state basis. Therefore, the input voltage Vi represented by Eq. 22 is canceled out by the average input voltage Via, so that the gain Ga of the entire system becomes equal to the gain G of the multiplier 12 (Ga=G). Namely, the gain Ga of the entire system holds irrespective of the input voltage Vi.

Figure 25:
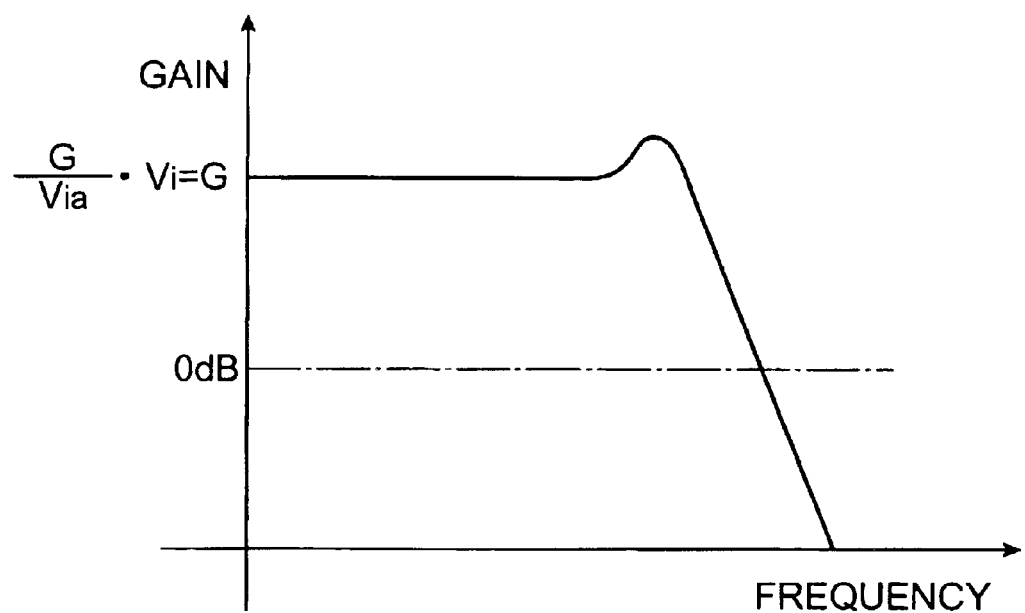
FIG. 25 is a frequency-gain characteristic diagram of the entire system of the switching power supply.

In the controller IC 7T, as described above, the gain G of the multiplier 12 is multiplied by the inverse (Da/Vr) of the average input voltage Via (=Vr/Da) (cf. Eq. 15), whereby the gain Ga of the entire system becomes independent of the input voltage Vi (cf. Eq. 22). Therefore, the gain Ga of the entire system remains unchanged even with change of the input voltage Vi. Incidentally, the gain of the switching power supply 1 has gain values according to frequencies because of the inductor 4 and capacitor 5. Accordingly, the gain Ga of the entire system also becomes equal to G in the low frequency region and varies according to frequencies in the high frequency region, as shown in FIG. 25.

The flow of signals at the counter 14, at the low-pass filter 1A, and at the divider 1B of the controller IC 7T will be described below with reference to the timing chart shown in FIG. 26. FIG. 26(a) is an illustration showing the waveform of the PWM signal KS outputted from the PWM signal generating circuit 20 of the controller IC 7T. As shown in FIG. 26(a), the PWM signal KS is outputted while alternately repeating signals at the low level and at the high level. FIG. 26(b) is an illustration showing the waveform of the signal cnt indicating the count-up state in the counter 14 of the controller IC 7T. FIG. 26(c) is an illustration showing the contents of the signal DS outputted from the counter 14. FIG. 26(d) is an illustration showing the pulse waveform of the reset signal RES generated based on the master clock MC of the switching power supply 1. As shown in FIG. 26(d), the reset signal RES is outputted while alternately repeating signals at the low level and at the high level at predetermined intervals. FIG. 26(e) is an illustration showing the pulse waveform of the sample signal SMP generated based on the master clock MC of the switching power supply 1. As shown in FIG. 26(e), the sample signal SMP is outputted while alternately repeating signals at the low level and at the high level at predetermined intervals. FIG. 26(f) is an illustration showing the contents of the signal AS outputted from the low-pass filter 1A of the controller IC 7T. FIG. 26(g) is an illustration showing the contents of the signal ES outputted from the divider 1B of the controller IC 7T.

First, when at a time t31 the PWM signal KS outputted from the PWM signal generating circuit 20 is switched from the low level to the high level (FIG. 26(a)), the counter 14 starts counting up the counter value previously reset (FIG. 26(b)). At the time t31, the reset signal RES turns from the low level to the high level (FIG. 26(d)).

When at a time t32 the PWM signal KS outputted from the PWM signal generating circuit 20 is then switched from the high level to the low level (FIG. 26(a)), the counter 14 stops the count-up operation (FIG. 26(b)). Namely, the counter 14 in the present embodiment counts an on time of the PWM signal KS.

When at a time t33 the sample signal SMP is then switched from the low level to the high level (FIG. 26(e)), the counter 14 outputs the signal DS indicating "Dn" being a count value at the present time (FIG. 26(c)). "Dn" being the output content of this signal DS is retained until the sample signal is next switched from the low level to the high level (time t35).

Figure 26:
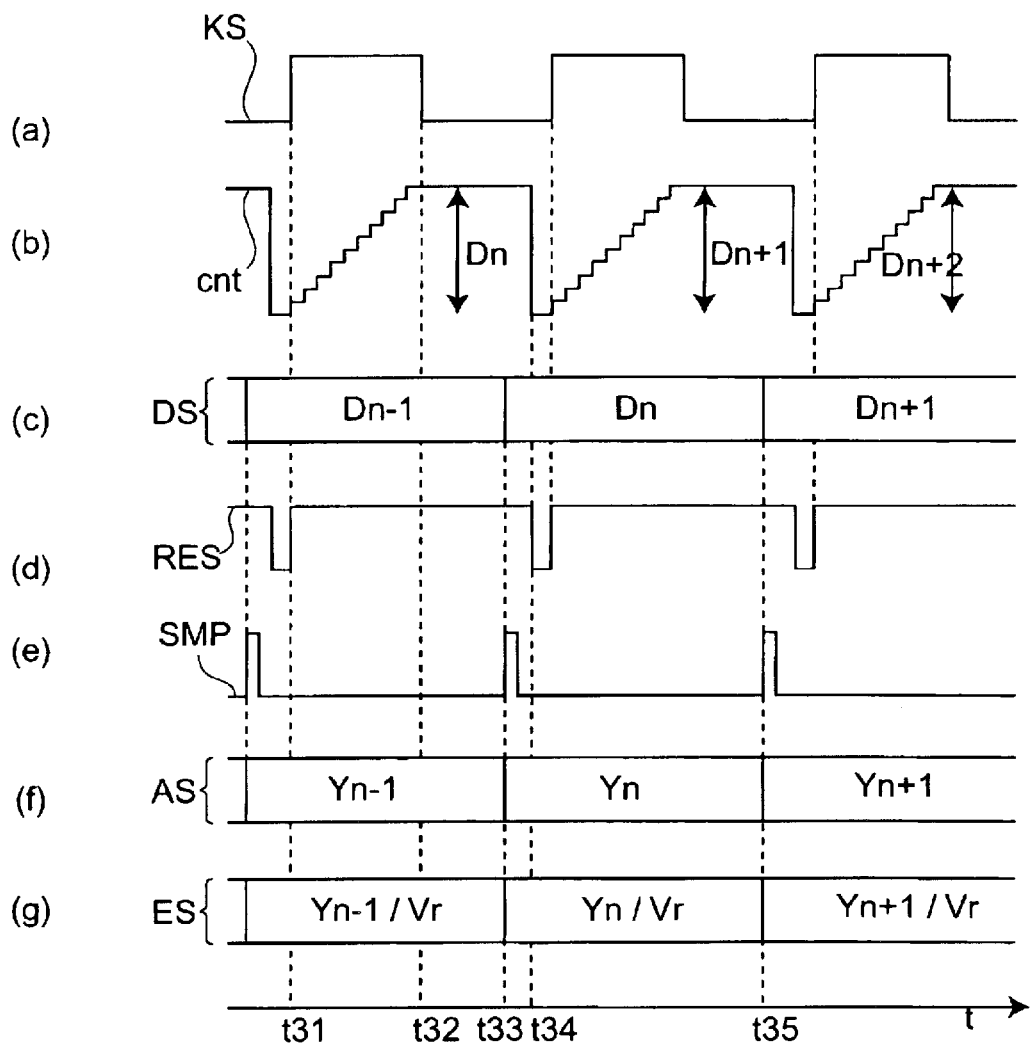
FIG. 26 is a timing chart to illustrate the flow of signals at the counter, at the low-pass filter, and at a divider in the third embodiment.

When at the time t33 the content of the signal DS outputted from the counter 14 is switched from "Dn−1" to "Dn" (FIG. 26(c)), the content of the signal AS outputted from the low-pass filter 1A turns from "Yn−1" to "Yn" (FIG. 26(*f*)). Yn indicates an average Da of duty ratios received in the past, as represented by Eq. 10 above. "Yn" being the output content of the signal AS is retained until the sample signal is next switched from the low level to the high level (time t35).

Furthermore, when at the time t33 the content of the signal AS outputted from the low-pass filter 1A is switched from "Yn−1" to "Yn" (FIG. 26(*f*)), the content of the signal ES outputted from the divider 1B turns from "(Yn−1)/Vr" to "Yn/Vr" (FIG. 26(*f*)). "Yn/Vr" being the output content of this signal ES is retained until the sample signal is next switched from the low level to the high level (time t35).

When at a time t34 the reset signal RES is then switched from the high level to the low level (FIG. 26(*d*)), the counter 14 resets the count value (FIG. 26(*b*)). This permits the counter 14 to start the counting operation in the next switching period from the count value after reset.

The flow of signals at the PWM signal generating circuit 20 of the controller IC 7T is similar to that in the phase compensation function by the phase lead described above (cf. FIG. 19), and thus the description thereof is omitted herein.

In the controller IC 7T having the gain adjusting function according to the input voltage, as described above, the duty ratio D of the PWM signal KS outputted from the controller IC 7T is fed back through the feedback loop and the gain Gc of the control system is adjusted by the inverse (Da/Vr) of the average input voltage Via; therefore, the gain G of the entire system remains unchanged even with change of the input voltage Vi. Therefore, the controller IC 7T is adaptable to a wide input voltage range and enables optimization of the phase margin. Accordingly, the response is good even at low input voltages Vi, and the output voltage is prevented from oscillating even at high input voltages Vi.

In the controller IC 7T having the gain adjusting function according to the input voltage, the duty ratio D of the PWM signal KS is detected by the simple circuit configuration with the counter 14, and the duty ratio D is averaged by making use of the averaging characteristic of the first-order low-pass filter 1A of the simple circuit configuration. Furthermore, the controller IC 7T is configured so that the average input voltage is estimated by the target voltage Vr and the average duty ratio Da, without need for any means for detecting the input voltage Vi and any means for averaging the input voltage Vi. Since the controller IC 7T uses the target voltage Vr as an average of the output voltage Vo, it does not have to be provided with any means for averaging the output voltage Vo.

As described above, the controller IC 7T in the present embodiment has ① the phase compensation function by the phase lead, ② the correction function for steady-state deviation, and ③ the gain adjusting function according to the input voltage, and the provision of these functions in combination permits, for example, the counter 14, low-pass filter 1A, and adder 19 to be used in common by the functions, which can achieve reduction in the number of components.

Fourth Embodiment

The fourth embodiment of the present invention will be described. The fourth embodiment is different in part of the configuration of the controller IC from the third embodiment. Therefore, only differences from the third embodiment will be detailed below and the components similar to those in the third embodiment will be denoted by the same reference symbols, without redundant description thereof.

Figure 27:
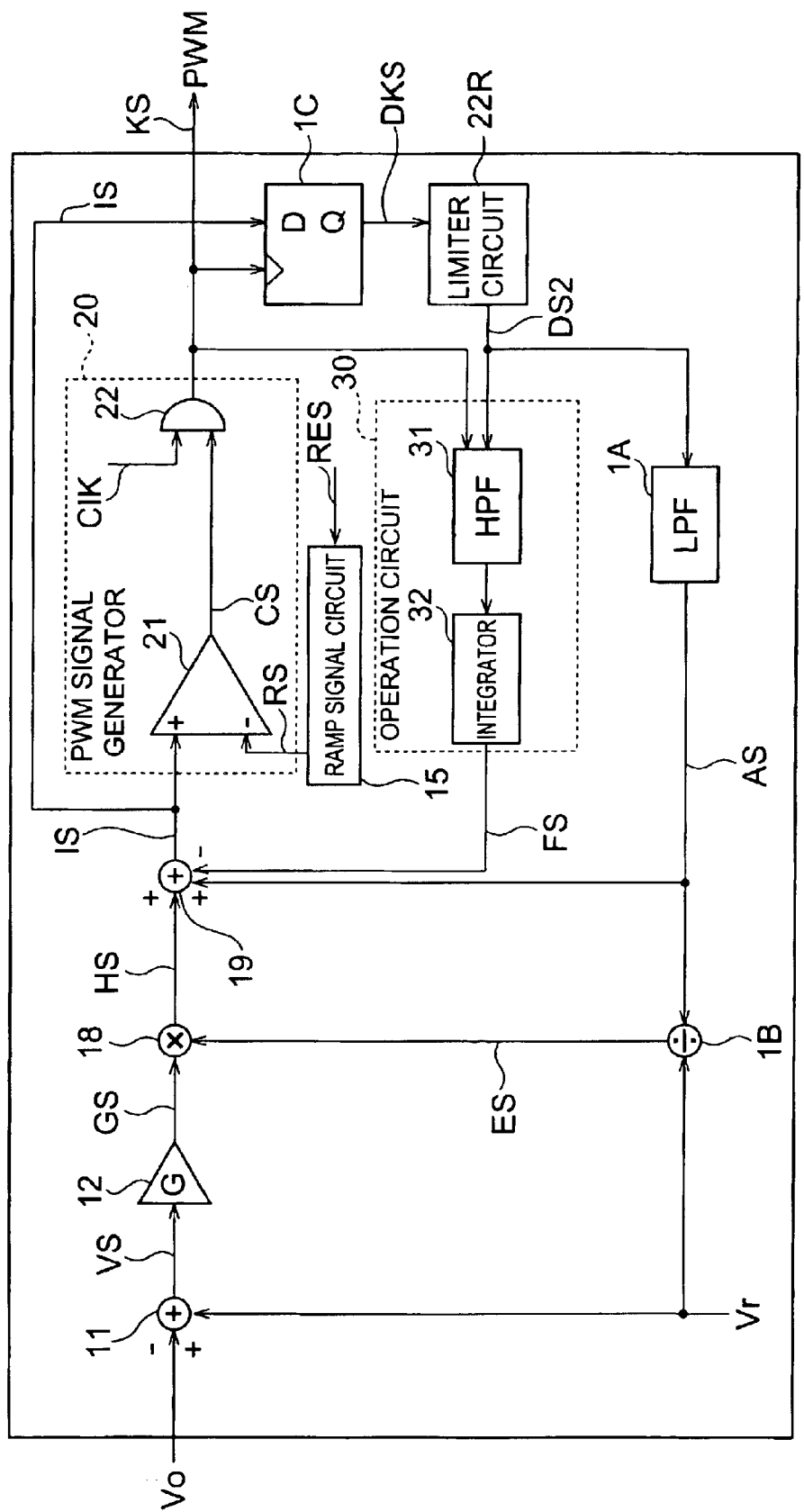
FIG. 27 is a circuit diagram showing a circuit configuration of a controller IC in the fourth embodiment.

First, the configuration of the controller IC 7F in the fourth embodiment will be described with reference to FIG. 27. As shown in FIG. 27, the controller IC 7F in the fourth embodiment is different from the configuration of the controller IC 7T in the third embodiment in that it further has a D flip-flop 1C (delay means) being a delay device, and a limiter circuit 22R and in that the counter 14 is excluded.

The D flip-flop 1C outputs a signal DKS, based on the signal IS outputted from the adder 19 and the PWM signal KS outputted from the PWM signal generating circuit 20. Namely, the D flip-flop 1C receives the signal IS as a D signal and the PWM signal KS as a clock signal, and outputs the signal DKS as a Q signal.

The limiter circuit 22R has a function corresponding to the AND circuit 22 and has a function of limiting the upper limit of the pulse width of the signal DKS outputted from the D flip-flop 1C, similar to the function of limiting the pulse width in the AND circuit 22.

Figure 28:
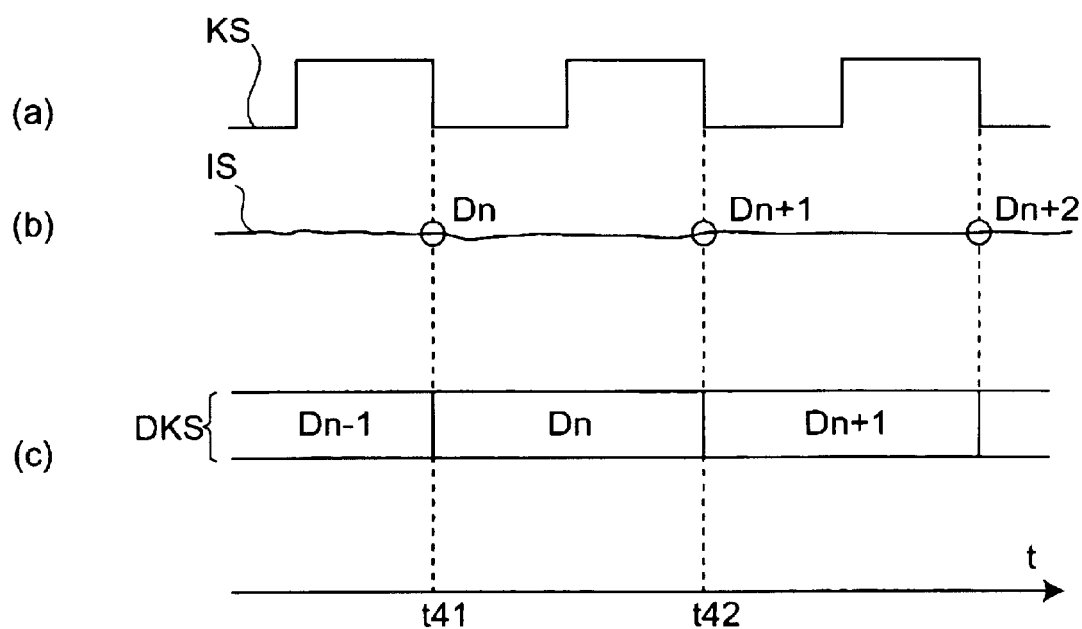
FIG. 28 is a timing chart to illustrate the flow of signals at a D flip-flop in the fourth embodiment.

The flow of signals at the D flip-flop 1C of the controller IC 7F will be described below with reference to the timing chart shown in FIG. 28. FIG. 28(*a*) is an illustration showing the waveform of the PWM signal KS outputted from the PWM signal generating circuit 20 of the controller IC 7F. FIG. 28(*b*) is an illustration showing the signal IS outputted from the adder 19 of the controller IC 7F. FIG. 28(*c*) is an illustration showing the contents of the signal DKS outputted from the D flip-flop 1C.

First, when at a time t41 the PWM signal KS outputted from the PWM signal generating circuit 20 is switched from the high level to the low level (FIG. 28(*a*)), the D flip-flop 1C outputs the signal DKS indicating "Dn" being a value of the signal IS at that time (FIG. 28(*b*) and (*c*)). "Dn" being the output content of this signal DKS is retained until the PWM signal KS is next switched from the high level to the low level (time t42). Namely, at the time t42, the D flip-flop 1C outputs the signal DKS indicating "Dn+1" being a value of the signal IS at that time (FIG. 28(*b*) and (*c*)).

The signal DKS outputted from the D flip-flop 1C is limited by the limiter circuit 22R to be outputted as a signal DS2, and this signal DS2 is fed into the operation circuit 30 and into the low-pass filter 1A.

The flow of signals at the PWM signal generating circuit 20 of the controller IC 7F is similar to that in the third embodiment and thus the description thereof is omitted herein.

As described above, the controller IC 7F in the fourth embodiment has the effects similar to those of the controller IC 7T in the third embodiment, and uses the D flip-flop 1C, instead of the counter 14 in the third embodiment, whereby the controller IC 7F in the fourth embodiment is able to detect the duty ratio D by the simple circuit configuration of the D flip-flop 1C.

In the third embodiment and fourth embodiment described above, the timing when the PWM signal KS outputted from the PWM signal generating circuit 20 is switched from the low level to the high level, is fixed, and the timing when the PWM signal KS is switched from the high level to the low level, is controlled based on the signal IS outputted from the adder 19 and the ramp signal RS outputted from the ramp signal circuit 15. However, the timing of switching of the PWM signal KS does not have to be limited to this. For example, it is also possible to adopt a configuration wherein the timing of switching of the PWM signal KS from the high level to the low level is fixed and wherein the timing of switching of the PWM signal KS from the low level to the high level is controlled based on the signal IS outputted from the adder 19 and the ramp signal RS outputted from the ramp signal circuit 15. In this case, the D flip-flop 1C in the aforementioned fourth embodiment may be configured to output the signal DKS corresponding to the value of the signal IS at the time when the PWM signal KS is switched from the low level to the high level.

Figure 29:
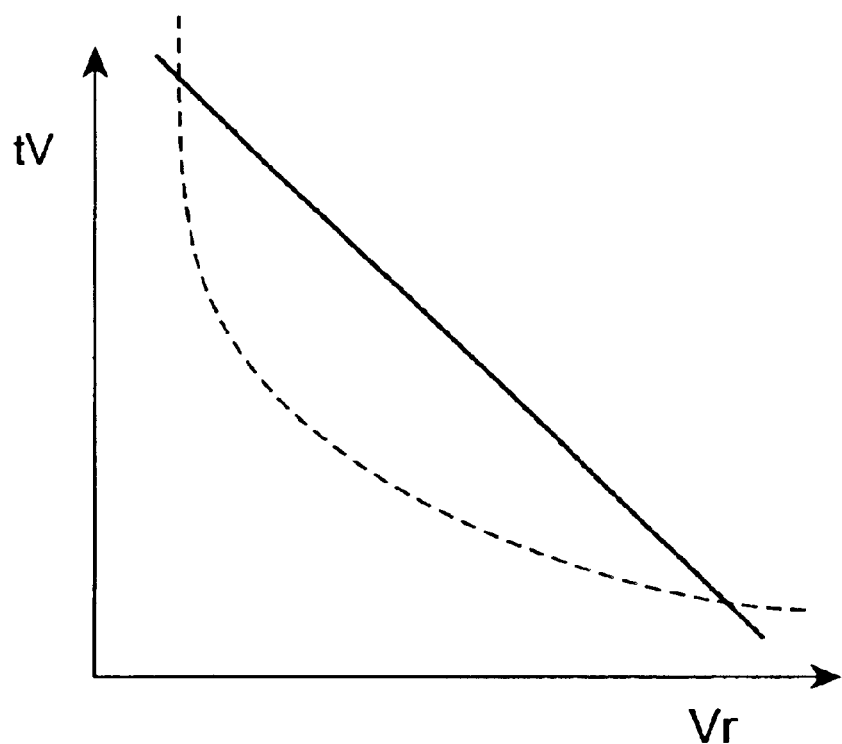
FIG. 29 shows table values against target voltages stored in a table.

In the third embodiment and fourth embodiment described above, the divider 1B generates and outputs the signal ES indicating the value of (Da/Vr), based on the digital signal indicating the target voltage Vr and the signal indicating the average Da of duty ratios D, but the means for generating the signal ES does not have to be limited to this. For example, a multiplier may be provided in place of the divider 1B, and a signal fed into this multiplier may be given as a signal corresponding to a table value tv stored in a table Ta. This table Ta is a table in which table values tv are set as values for conversion of the target voltage Vr. The contents of the table values stored in this table Ta are presented in FIG. 29. As shown in FIG. 29, the table values tv stored in the table Ta are not inverse values of the target voltage Vr (tv against Vr indicated by a dashed line in FIG. 29), but are values of a linear function (tv against Vr indicated by a solid line in FIG. 29) having a negative proportionality factor (e.g., −1) with the target voltage Vr as a parameter. This is because the use of linear function values makes the variation in the gain Ga of the entire system smaller than that with the use of the inverse values. A reason for it can be internal loss or the like due to the internal resistances of the respective elements in the switching power supply 1. The table Ta is preliminarily stored in a memory means such as ROM or the like of the controller IC 7T, 7F. The multiplier receives the table value tv in the table Ta according to the target voltage Vr and the average duty ratio Da from the low-pass filter 1A, multiplies the average Da by the table value tv, and outputs the product of "Da×tv" as a gain adjustment value to the multiplier 18. Since the controller IC is provided with the multiplier 22 and the table Ta, instead of the divider of the complex circuit configuration, it is able to set the gain adjustment value by the simple circuit configuration. Since the table values tv in the table Ta are set as values of a linear function, instead of the inverse values of the target voltage Vr, it is feasible to reduce the variation in the gain Ga of the entire system.

Furthermore, instead of the above-described table Ta, a converting means may also be constructed of a multiplier with a negative multiplication coefficient and an adder for adding a predetermined value (e.g., a Y-intercept of the solid-line graph shown in FIG. 29). The table values tv in the table Ta were set as values of a linear function with the target voltage as a parameter, but they may also be set as inverse values with the target voltage as a parameter or as optimal values according to characteristics of the switching power supply.

The above-described third embodiment and fourth embodiment employed the configuration using the target voltage Vr in the calculation of the gain adjustment value, but it is also possible to provide the system with an output voltage averaging means for averaging the output voltage detected by a sensor or the like, and adopt a configuration of calculating the gain adjustment value from the average output voltage and the average duty ratio or a configuration of calculating the gain adjustment value from the average output voltage and the duty ratio. Particularly, in cases where the output voltage is stable, the detected output voltage can be directly used without averaging the output voltage, for example, in a configuration wherein the gain adjustment value is set from the output voltage and the average duty ratio or in a configuration wherein the gain adjustment value is set from the output voltage and the duty ratio.

The controller ICs (switching power supply controllers) and switching power supplies in the third embodiment and fourth embodiment described above are able to achieve the phase lead so as to implement the phase compensation, ensure the stable output voltage even with change of the input voltage or the load current, and stabilize the gain of the entire system even with change of the input voltage.

Modification Examples

In each of the embodiments described above, the configuration of the operation circuit described was the one wherein the operation circuit 30 was comprised of the high-pass filter 31 and the integrator 32, but the configuration of the operation circuit 30 is not limited to this. For example, the operation circuit may also be constructed in one of circuit configurations as shown in FIGS. 30 to 34.

Figure 30:
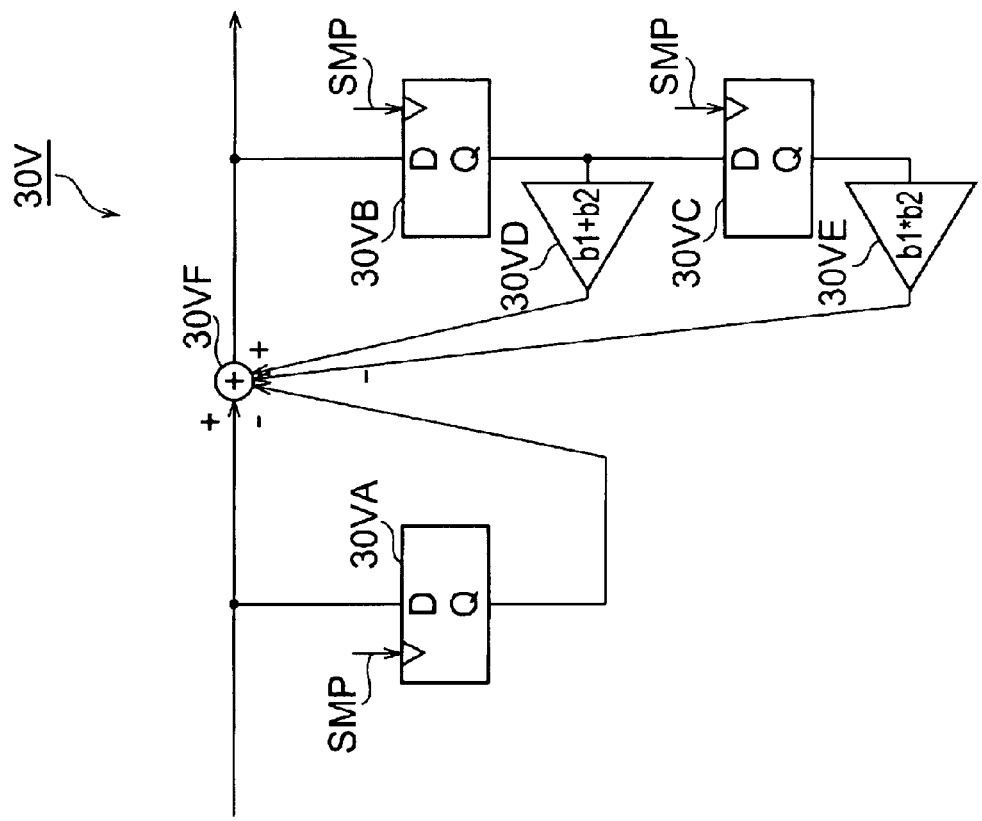
FIG. 30 is a circuit diagram showing a detailed circuit configuration of an operation circuit in a modification example.
Figure 31:
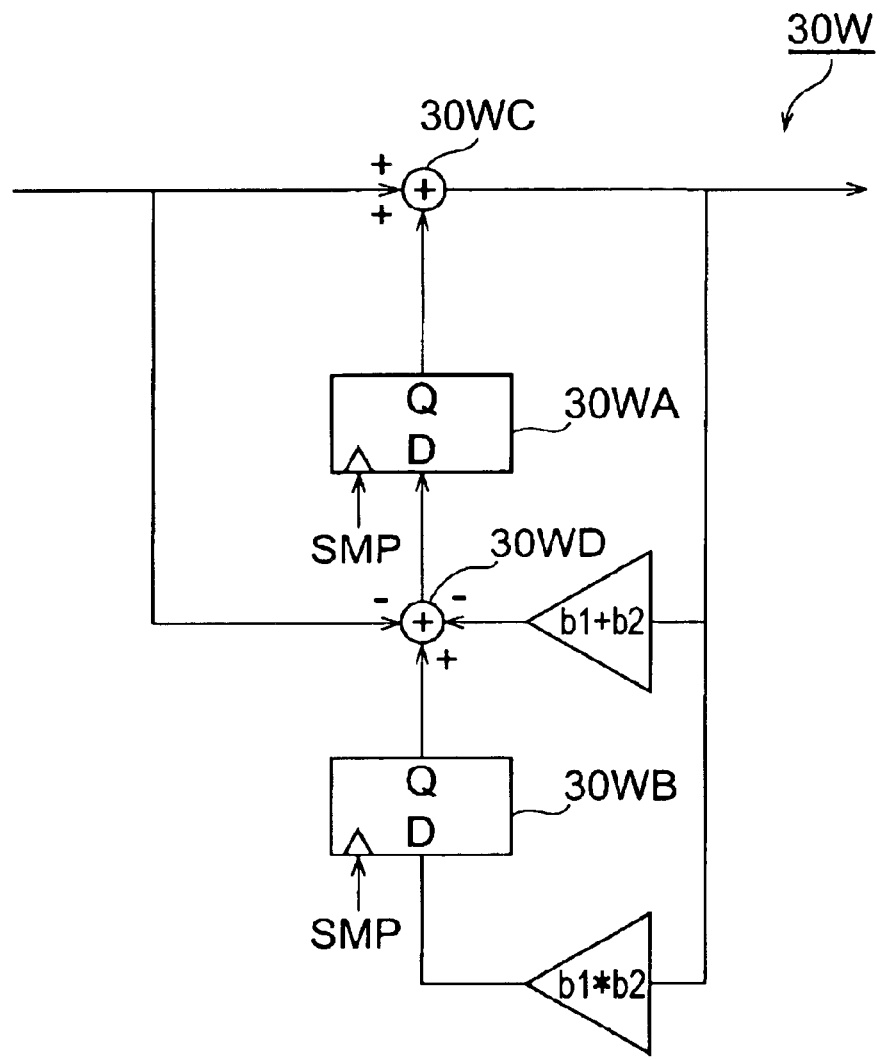
FIG. 31 is a circuit diagram showing a detailed circuit configuration of an operation circuit in another modification example.
Figure 32:
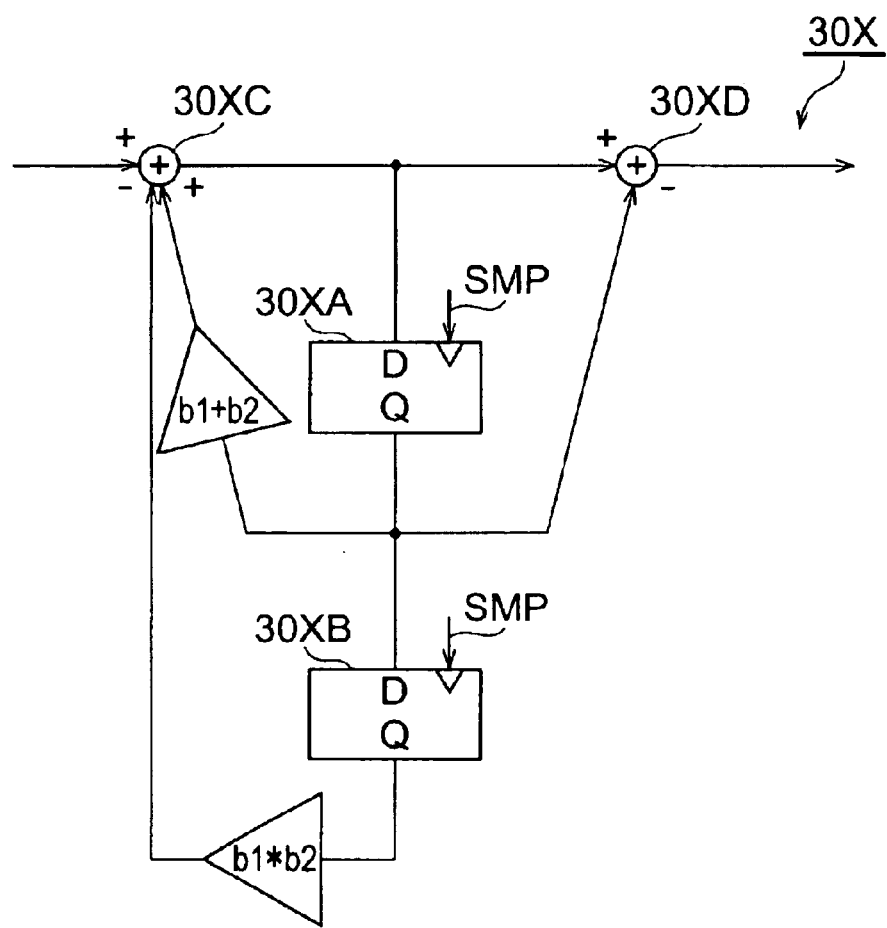
FIG. 32 is a circuit diagram showing a detailed circuit configuration of an operation circuit in still another modification example.

FIGS. 30 to 32 are illustrations showing detailed circuit configurations of operation circuits 30V, 30W, and 30X as integration of a second-order high-pass filter and an integrator. The operation circuit 30V shown in FIG. 30 has D flip-flops 30VA to 30VC being delay devices, a multiplier 30VD with a multiplication coefficient of "b1+b2", a multiplier 30VE with a multiplication coefficient of "b1*b2", and an adder 30VF. The operation circuit 30W shown in FIG. 31 has D flip-flops 30WA, 30WB being delay devices, and adders 30WC, 30WD. The operation circuit 30X shown in FIG. 32 has D flip-flops 30XA, 30XB being delay devices, and adders 30XC, 30XD.

The circuit configurations of the operation circuits 30V, 30W, 30X are constructed based on a transfer function H(Z) of the operation circuits 30V, 30W, 30X represented by Eq. 23 below.

$$H(Z)=(1-Z^{-1})/[(1-b1^*Z^{-1})(1-b2^*Z^{-1})] \quad (\text{Eq. 23})$$

(b1 and b2 are coefficients)

This Eq. 23 is obtained by multiplying a transfer function of the second-order high-pass filter by a transfer function of the integrator.

Figure 33:
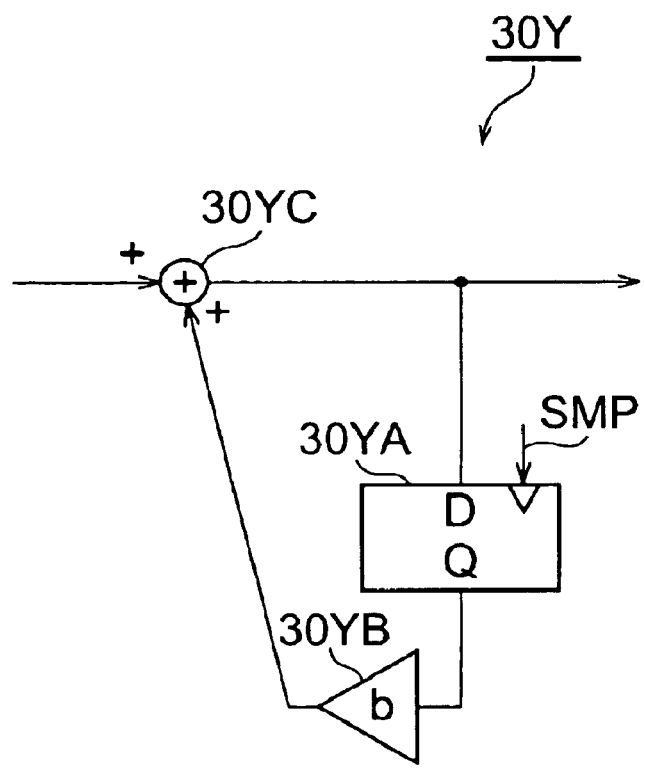
FIG. 33 is a circuit diagram showing a detailed circuit configuration of an operation circuit in still another modification example.

FIG. 33 is an illustration showing a detailed circuit configuration of an operation circuit 30Y integrally having the function of the first-order high-pass filter and the function of the integrator. The circuit configuration of this operation circuit 30Y herein does not include a circuit configuration of a first-order high-pass filter and an integrator separately combined in succession. The operation circuit 30X shown in FIG. 33 has a D flip-flop 30YA being a delay device, a multiplier 30YB with a multiplication coefficient of "b", and an adder 30YC. This circuit configuration is constructed based on a transfer function H(Z) of the operation circuit 30Y represented by Eq. 24 below.

$$H(Z)=1/(1-b^*Z^{-1}) \quad (\text{Eq. 24})$$

(b is a coefficient)

This Eq. 24 is obtained by multiplying a transfer function of the first-order high-pass filter by a transfer function of the integrator.

Figure 34:
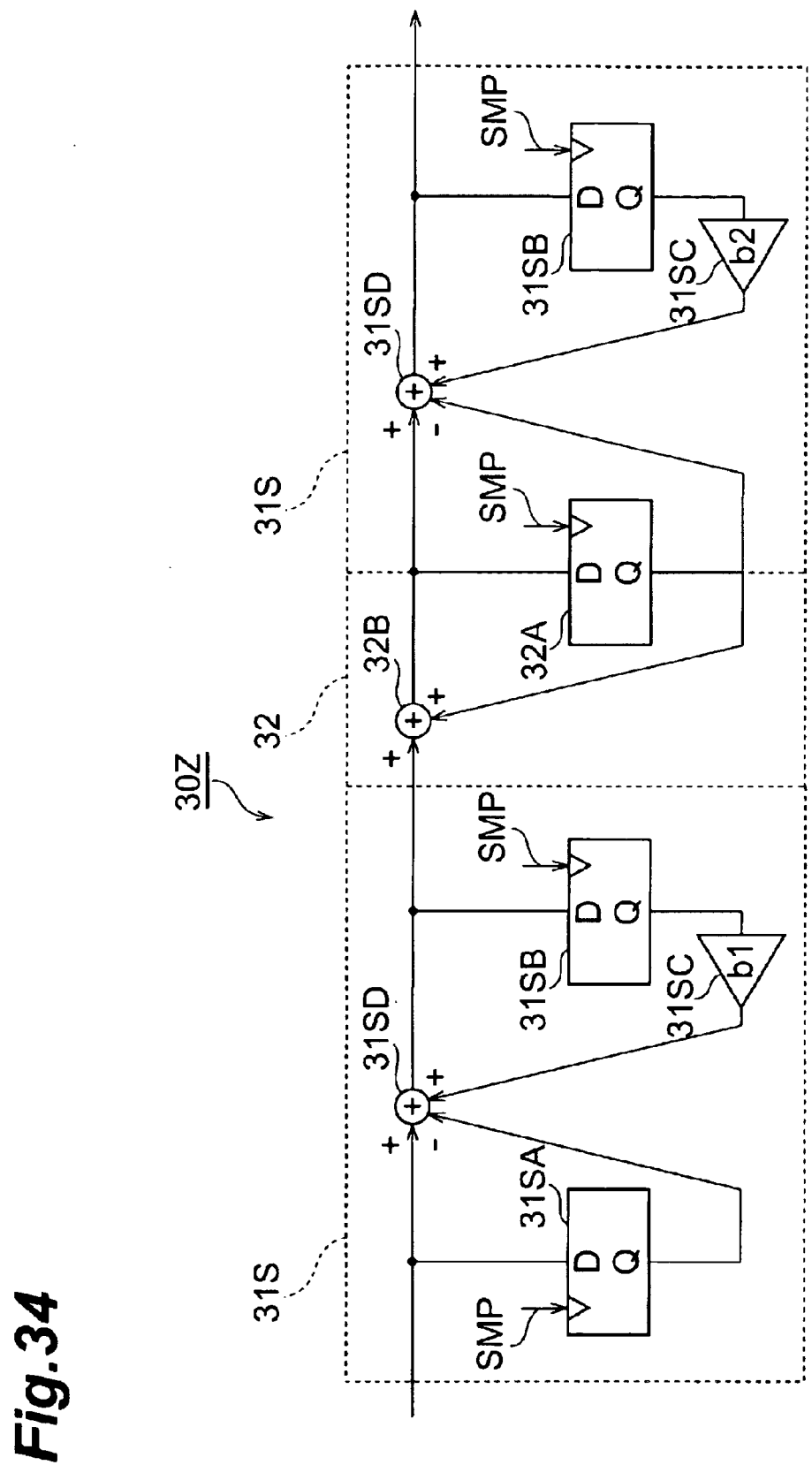
FIG. 34 is a circuit diagram showing a detailed circuit configuration of an operation circuit in still another modification example.

FIG. 34 is an illustration showing a detailed circuit configuration of an operation circuit 30Z having first-order high-pass filters 31S and a multiplier 32. As shown in FIG. 34, the multiplier 32 is interposed between two first-order high-pass filters 31S, receives a signal outputted from one first-order high-pass filter 31S, and outputs a signal after multiplication in the multiplier 32 to the other first-order high-pass filter 31S. A delay device 32A shown in FIG. 34 is shared between the multiplier 32 and the first-order high-pass filter 31S disposed on the output side of the multiplier 32. This circuit configuration is constructed based on the transfer functions of the first-order high-pass filters and the transfer function of the integrator.

In each of the above-described embodiments, the A/D converter was constructed as an external device outside the controller IC, but the A/D converter may be incorporated in the controller IC.

In each of the above-described embodiments the controller IC was constructed of digital circuits, but it may also be constructed of analog circuits. Furthermore, the functions of the respective parts in the above-stated controller IC may be implemented by a program (software) installed in a computer such as a microcomputer or the like. The program to implement the functions of the respective parts is distributed by storage media such as CD-ROM and the like or by delivery through the Internet or the like in some cases, or is distributed as a controller IC as installed in a computer in certain cases.

The present invention was applied to the DC/DC converters in the above embodiments, but the present invention is also applicable to AC/DC converters and DC/AC converters. The present invention is also applicable to non-isolated and buck type converters without a transformer, to isolated converters with a transformer, and to boost type or buck/boost type converters.

What is claimed is:

1. A switching power supply controller for outputting a drive signal for controlling a switching element of a switching power supply, to the switching power supply, the switching power supply controller comprising:

a high-pass filter for cutting off a low-frequency component included in a signal corresponding to a duty ratio of the drive signal;

integrating means for integrating a signal resulting from the cutoff of the low-frequency component by the high-pass filter;

difference calculating means for calculating a difference between a signal indicating a difference between an output voltage of the switching power supply and a target voltage for the output voltage, and a signal resulting from the integration by the integrating means; and drive signal generating means for generating the drive signal, based on a signal resulting from the calculation by the difference calculating means, and a ramp signal.

2. The switching power supply controller according to claim 1, wherein the high-pass filter is a second-order high-pass filter.

3. The switching power supply controller according to claim 1, further comprising counter means for counting an on time of the drive signal generated by the drive signal generating means, every switching period, wherein the signal corresponding to the duty ratio of the drive signal is a signal indicating a value resulting from the counting by the counter means.

4. The switching power supply controller according to claim 1, further comprising delay means for retaining the signal resulting from the calculation by the difference calculating means, for a predetermined time and then outputting the signal, wherein the signal corresponding to the duty ratio of the drive signal is the signal outputted by the delay means.

5. The switching power supply controller according to claim 4, wherein the drive signal generating means switches a level of the drive signal from a low level to a high level at a predetermined interval and switches the level of the drive signal from the high level to the low level on the basis of a result of a comparison between the signal resulting from the calculation by the difference calculating means, and the ramp signal, and wherein, based on the signal resulting from the calculation by the difference calculating means at a time of switching when the output level of the drive signal is switched from the high level to the low level, the delay means detects a value corresponding to the signal resulting from the calculation and outputs the detected value until a next time of the switching.

6. The switching power supply controller according to claim 4, wherein the drive signal generating means switches a level of the drive signal from a high level to a low level at a predetermined interval and switches the level of the drive signal from the low level to the high level on the basis of a result of a comparison between the signal resulting from the calculation by the difference calculating means, and the ramp signal, and wherein, based on the signal resulting from the calculation by the difference calculating means at a time of switching when the output level of the drive signal is switched from the low level to the high level, the delay means detects a value corresponding to the signal resulting from the calculation and outputs the detected value until a next time of the switching.

7. The switching power supply controller according to claim 1, wherein the drive signal generating means switches an output level of the drive signal to a high level or to a low level on the basis of a result of a comparison between the signal resulting from the calculation by the difference calculating means, and the ramp signal.

8. A switching power supply comprising the switching power supply controller as set forth in claim 1.

9. A switching power supply controller for outputting a drive signal for controlling a switching element of a switching power supply, to the switching power supply, the switching power supply controller comprising:

operation means for performing an operation on a signal corresponding to a duty ratio of the drive signal, the operation means integrally having a high-pass filter function and an integrating function;

difference calculating means for calculating a difference between a signal indicating a difference between an output voltage of the switching power supply and a target voltage for the output voltage, and a signal resulting from the operation by the operation means; and drive signal generating means for generating the drive signal on the basis of a signal resulting from the calculation by the difference calculating means, and a ramp signal.

10. The switching power supply controller according to claim 9, wherein the operation means is configured based on a transfer function H(Z) of the operation means as defined below:

$$H(Z)=1/(1-b*Z^{-1})$$

(b is a coefficient).

11. The switching power supply controller according to claim 9, wherein the operation means is configured based on a transfer function H(Z) of the operation means as defined below:

$$H(Z)=(1-Z-1)/[(1-b1*Z^{-1})(1-b2*Z^{-1})]$$

(b1 and b2 are coefficients).

12. The switching power supply controller according to claim 9, further comprising counter means for counting an on time of the drive signal generated by the drive signal generating means, every switching period, wherein the signal corresponding to the duty ratio of the drive signal is a signal indicating a value resulting from the counting by the counter means.

13. The switching power supply controller according to claim 9, further comprising delay means for retaining the signal resulting from the calculation by the difference calculating means, for a predetermined time and then outputting the signal, wherein the signal corresponding to the duty ratio of the drive signal is the signal outputted by the delay means.

14. The switching power supply controller according to claim 13, wherein the drive signal generating means switches a level of the drive signal from a low level to a high level at a predetermined interval and switches the level of the drive signal from the high level to the low level on the basis of a result of a comparison between the signal resulting from the calculation by the difference calculating means, and the ramp signal, and wherein, based on the signal resulting from the calculation by the difference calculating means at a time of switching when the output level of the drive signal is switched from the high level to the low level, the delay means detects a value corresponding to the signal resulting from the calculation and outputs the detected value until a next time of the switching.

15. The switching power supply controller according to claim 13, wherein the drive signal generating means switches a level of the drive signal from a high level to a low level at a predetermined interval and switches the level of the drive signal from the low level to the high level on the basis of a result of a comparison between the signal resulting from the calculation by the difference calculating means, and the ramp signal, and wherein, based on the signal resulting from the calculation by the difference calculating means at a time of switching when the output level of the drive signal is switched from the low level to the high level, the delay means detects a value corresponding to the signal resulting from the calculation and outputs the detected value until a next time of the switching.

16. The switching power supply controller according to claim 9, wherein the drive signal generating means switches an output level of the drive signal to a high level or to a low level on the basis of a result of a comparison between the signal resulting from the calculation by the difference calculating means, and the ramp signal.

17. A switching power supply comprising the switching power supply controller as set forth in claim 9.

18. A switching power supply controller for outputting a drive signal for controlling a switching element of a switching power supply, to the switching power supply, the switching power supply controller comprising:

a first high-pass filter for cutting off a low-frequency component included in a signal corresponding to a duty ratio of the drive signal;

integrating means for integrating a signal resulting from the cutoff of the low-frequency component by the first high-pass filter;

a second high-pass filter for cutting off a low-frequency component included in a signal resulting from the integration by the integrating means;

difference calculating means for calculating a difference between a signal indicating a difference between an output voltage of the switching power supply and a target voltage for the output voltage, and a signal resulting from the cutoff of the low-frequency component by the second high-pass filter; and drive signal generating means for generating the drive signal on the basis of a signal resulting from the calculation by the difference calculating means, and a ramp signal.

19. The switching power supply controller according to claim 18, wherein the first high-pass filter and the second high-pass filter are first-order high-pass filters.

20. The switching power supply controller according to claim 18, further comprising counter means for counting an on time of the drive signal generated by the drive signal generating means, every switching period, wherein the signal corresponding to the duty ratio of the drive signal is a signal indicating a value resulting from the counting by the counter means.

21. The switching power supply controller according to claim 18, further comprising delay means for retaining the signal resulting from the calculation by the difference calculating means, for a predetermined time and then outputting the signal, wherein the signal corresponding to the duty ratio of the drive signal is the signal outputted by the delay means.

22. The switching power supply controller according to claim 21, wherein the drive signal generating means switches a level of the drive signal from a low level to a high level at a predetermined interval and switches the level of the drive signal from the high level to the low level on the basis of a result of a comparison between the signal resulting from the calculation by the difference calculating means, and the ramp signal, and wherein, based on the signal resulting from the calculation by the difference calculating means at a time of switching when the output level of the drive signal is switched from the high level to the low level, the delay means detects a value corresponding to the signal resulting from the calculation and outputs the detected value until a next time of the switching.

23. The switching power supply controller according to claim 21, wherein the drive signal generating means switches a level of the drive signal from a high level to a low level at a predetermined interval and switches the level of the drive signal from the low level to the high level on the basis of a result of a comparison between the signal resulting from the calculation by the difference calculating means, and the ramp signal, and wherein, based on the signal resulting from the calculation by the difference calculating means at a time of switching when the output level of the drive signal is switched from the low level to the high level, the delay means detects a value corresponding to the signal resulting from the calculation and outputs the detected value until a next time of the switching.

24. The switching power supply controller according to claim 18, wherein the drive signal generating means switches an output level of the drive signal to a high level or to a low level on the basis of a result of a comparison between the signal resulting from the calculation by the difference calculating means, and the ramp signal.

25. A switching power supply comprising the switching power supply controller as set forth in claim 18.

26. A switching power supply controller for outputting a drive signal for controlling a switching element of a switch ing power supply, to the switching power supply, the switching power supply controller comprising:

a high-pass filter for cutting off a low-frequency component included in a signal corresponding to a duty ratio of the drive signal;

integrating means for integrating a signal resulting from the cutoff of the low-frequency component by the high-pass filter;

averaging means for obtaining an average of said duty ratio on the basis of the signal corresponding to the duty ratio of the drive signal;

gain adjustment value calculating means for calculating a gain adjustment value on the basis of a signal corresponding to the average duty ratio obtained by the averaging means, and a signal indication a target voltage for an output voltage in the switching power supply;

multiplying means for multiplying a signal indicating a difference between the output voltage of the switching power supply and the target voltage, by the gain adjustment value calculated by the gain adjustment value calculating means;

adding means for adding up a signal resulting from the multiplication by the multiplying means, the signal corresponding to the average duty ratio obtained by the averaging means, and a signal resulting from the integration by the integrating means; and drive signal generating means for generating the drive signal on the basis of a signal resulting from the addition by the adding means, and a ramp signal.

27. The switching power supply controller according to claim 26, wherein the high-pass filter is a second-order high-pass filter.

28. The switching power supply controller according to claim 26, further comprising counter means for counting an on time of the drive signal generated by the drive signal generating means, every switching period, wherein the signal corresponding to the duty ratio of the drive signal is a signal indicating a value resulting from the counting by the counter means.

29. The switching power supply controller according to claim 26, further comprising delay means for retaining the signal resulting from the addition by the adding means, for a predetermined time and then outputting the signal, wherein the signal corresponding to the duty ratio of the drive signal is the signal outputted by the delay means.

30. The switching power supply controller according to claim 29, wherein the drive signal generating means switches a level of the drive signal from a low level to a high level at a predetermined interval and switches the level of the drive signal from the high level to the low level on the basis of a result of a comparison between the signal resulting from the addition by the adding means, and the ramp signal, and wherein, based on the signal resulting from the addition by the adding means at a time of switching when the output level of the drive signal is switched from the high level to the low level, the delay means detects a value corresponding to the signal resulting from the addition and outputs the detected value until a next time of the switching.

31. The switching power supply controller according to claim 29, wherein the drive signal generating means switches a level of the drive signal from a high level to a low level at a predetermined interval and switches the level of the drive signal from the low level to the high level on the basis of a result of a comparison between the signal resulting from the addition by the adding means, and the ramp signal, and wherein, based on the signal resulting from the addition by the adding means at a time of switching when the output level of the drive signal is switched from the low level to the high level, the delay means detects a value corresponding to the signal resulting from the addition and outputs the detected value until a next time of the switching.

32. The switching power supply controller according to claim 26, wherein the drive signal generating means switches an output level of the drive signal to a high level or to a low level on the basis of a result of a comparison between the signal resulting from the addition by the adding means, and the ramp signal.

33. The switching power supply controller according to claim 26, wherein the averaging means is a low-pass filter.

34. A switching power supply comprising the switching power supply controller as set forth in claim 26.

35. A switching power supply controller for outputting a drive signal for controlling a switching element of a switching power supply, to the switching power supply, the switching power supply controller comprising:

operation means for performing an operation on a signal corresponding to a duty ratio of the drive signal, the operation means integrally having a high-pass filter function and an integrating function;

averaging means for obtaining an average of the duty ratio on the basis of the signal corresponding to the duty ratio of the drive signal;

gain adjustment value calculating means for calculating a gain adjustment value on the basis of a signal corresponding to the average duty ratio obtained by the averaging means, and a signal indicating a target voltage for an output voltage in the switching power supply;

multiplying means for multiplying a signal indicating a difference between the output voltage of the switching power supply and the target voltage, by the gain adjustment value calculated by the gain adjustment value calculating means;

adding means for adding up a signal resulting from the multiplication by the multiplying means, the signal corresponding to the average duty ratio obtained by the averaging means, and a signal resulting from the operation by the operation means; and drive signal generating means for generating the drive signal on the basis of a signal resulting from the addition by the adding means, and a ramp signal.

36. The switching power supply controller according to claim 35, wherein the operation means is configured based on a transfer function H(Z) of the operation means as defined below:

$$H(Z)=1/(1-b*Z^{-1})$$

(b is a coefficient).

37. The switching power supply controller according to claim 35, wherein the operation means is configured based on a transfer function H(Z) of the operation means as defined below:

$$H(Z)=(1-Z^{-1})/[(1-b1*Z^{-1})(1b2*Z^{-1})]$$

(b1 and b2 are coefficients).

38. The switching power supply controller according to claim 35, further comprising counter means for counting an on time of the drive signal generated by the drive signal generating means, every switching period, wherein the signal corresponding to the duty ratio of the drive signal is a signal indicating a value resulting from the counting by the counter means.

39. The switching power supply controller according to claim 35, further comprising delay means for retaining the signal resulting from the addition by the adding means, for a predetermined time and then outputting the signal, wherein the signal corresponding to the duty ratio of the drive signal is the signal outputted by the delay means.

40. The switching power supply controller according to claim 39, wherein the drive signal generating means switches a level of the drive signal from a low level to a high level at a predetermined interval and switches the level of the drive signal from the high level to the low level on the basis of a result of a comparison between the signal resulting from the addition by the adding means, and the ramp signal, and wherein, based on the signal resulting from the addition by the adding means at a time of switching when the output level of the drive signal is switched from the high level to the low level, the delay means detects a value corresponding to the signal resulting from the addition and outputs the detected value until a next time of the switching.

41. The switching power supply controller according to claim 39, wherein the drive signal generating means switches a level of the drive signal from a high level to a low level at a predetermined interval and switches the level of the drive signal from the low level to the high level on the basis of a result of a comparison between the signal resulting from the addition by the adding means, and the ramp signal, and wherein, based on the signal resulting from the addition by the adding means at a time of switching when the output level of the drive signal is switched from the low level to the high level, the delay means detects a value corresponding to the signal resulting from the addition and outputs the detected value until a next time of the switching.

42. The switching power supply controller according to claim 35, wherein the drive signal generating means switches an output level of the drive signal to a high level or to a low level on the basis of a result of a comparison between the signal resulting from the addition by the adding means, and the ramp signal.

43. The switching power supply controller according to claim 35, wherein the averaging means is a low-pass filter.

44. A switching power supply comprising the switching power supply controller as set forth in claim 35.

45. A switching power supply controller for outputting a drive signal for controlling a switching element of a switching power supply, to the switching power supply, the switching power supply controller comprising:

a first high-pass filter for cutting off a low-frequency component included in a signal corresponding to a duty ratio of the drive signal;

integrating means for integrating a signal resulting from the cutoff of the low-frequency component by the first high-pass filter;

a second high-pass filter for cutting off a low-frequency component included in a signal resulting from the integration by the integrating means;

averaging means for obtaining an average of said duty ratio on the basis of the signal corresponding to the duty ratio of the drive signal;

gain adjustment value calculating means for calculating a gain adjustment value on the basis of a signal corresponding to the average duty ratio obtained by the averaging means, and a signal indicating a target voltage for an output voltage in the switching power supply;

multiplying means for multiplying a signal indicating a difference between the output voltage of the switching power supply and the target voltage, by the gain adjustment value calculated by the gain adjustment value calculating means;

adding means for adding up a signal resulting from the multiplication by the multiplying means, the signal corresponding to the average duty ratio obtained by the averaging means, and a signal resulting from the cutoff of the low-frequency component by the second high-pass filter; and drive signal generating means for generating the drive signal on the basis of a signal resulting from the addition by the adding means, and a ramp signal.

46. The switching power supply controller according to claim 45, wherein the first high-pass filter and the second high-pass filter are first-order high-pass filters.

47. The switching power supply controller according to claim 45, further comprising counter means for counting an on time of the drive signal generated by the drive signal generating means, every switching period, wherein the signal corresponding to the duty ratio of the drive signal is a signal indicating a value resulting from the counting by the counter means.

48. The switching power supply controller according to claim 45, further comprising delay means for retaining the signal resulting from the addition by the adding means, for a predetermined time and then outputting the signal, wherein the signal corresponding to the duty ratio of the drive signal is the signal outputted by the delay means.

49. The switching power supply controller according to claim 48, wherein the drive signal generating means switches a level of the drive signal from a low level to a high level at a predetermined interval and switches the level of the drive signal from the high level to the low level on the basis of a result of a comparison between the signal resulting from the addition by the adding means, and the ramp signal, and wherein, based on the signal resulting from the addition by the adding means at a time of switching when the output level of the drive signal is switched from the high level to the low level, the delay means detects a value corresponding to the signal resulting from the addition and outputs the detected value until a next time of the switching.

50. The switching power supply controller according to claim 48, wherein the drive signal generating means switches a level of the drive signal from a high level to a low level at a predetermined interval and switches the level of the drive signal from the low level to the high level on the basis of a result of a comparison between the signal resulting from the addition by the adding means, and the ramp signal, and wherein, based on the signal resulting from the addition by the adding means at a time of switching when the output level of the drive signal is switched from the low level to the high level, the delay means detects a value corresponding to the signal resulting from the addition and outputs the detected value until a next time of the switching.

51. The switching power supply controller according to claim 45, wherein the drive signal generating means switches an output level of the drive signal to a high level or to a low level on the basis of a result of a comparison between the signal resulting from the addition by the adding means, and the ramp signal.

52. The switching power supply controller according to claim 45, wherein the averaging means is a low-pass filter.

53. A switching power supply comprising the switching power supply controller as set forth in claim 45.

* * * * *